United States Patent
Inoue et al.

(10) Patent No.: US 11,495,378 B2
(45) Date of Patent: Nov. 8, 2022

(54) GRAIN-ORIENTED ELECTRICAL STEEL SHEET, STACKED TRANSFORMER CORE USING THE SAME, AND METHOD FOR PRODUCING STACKED CORE

(71) Applicant: JFE STEEL CORPORATION, Tokyo (JP)

(72) Inventors: Hirotaka Inoue, Tokyo (JP); Seiji Okabe, Tokyo (JP); Takeshi Omura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 110 days.

(21) Appl. No.: 16/966,268

(22) PCT Filed: Jan. 31, 2019

(86) PCT No.: PCT/JP2019/003402
§ 371 (c)(1),
(2) Date: Jul. 30, 2020

(87) PCT Pub. No.: WO2019/151401
PCT Pub. Date: Aug. 8, 2019

(65) Prior Publication Data
US 2020/0373046 A1  Nov. 26, 2020

(30) Foreign Application Priority Data
Jan. 31, 2018  (JP) .............................. JP2018-014245

(51) Int. Cl.
*H01F 7/06* (2006.01)
*H01F 1/16* (2006.01)
(Continued)

(52) U.S. Cl.
CPC ............. *H01F 1/16* (2013.01); *C22C 38/002* (2013.01); *C22C 38/02* (2013.01); *C22C 38/04* (2013.01);
(Continued)

(58) Field of Classification Search
CPC ......... C22C 38/00; C22C 38/02; C22C 38/04; C22C 38/42; C22C 38/44; C22C 38/60;
(Continued)

(56) References Cited

U.S. PATENT DOCUMENTS

| | | |
|---|---|---|
| 5,296,051 A | 3/1994 | Inokuti et al. |
| 2016/0133368 A1 | 5/2016 | Okabe et al. |

(Continued)

FOREIGN PATENT DOCUMENTS

| | | |
|---|---|---|
| CN | 103827326 A | 5/2014 |
| EP | 0 892 072 A1 | 1/1999 |

(Continued)

OTHER PUBLICATIONS

Dec. 24, 2021 Office Action issued in Chinese Patent Application No. 201980011020.X.
(Continued)

*Primary Examiner* — Paul D Kim
(74) *Attorney, Agent, or Firm* — Oliff PLC

(57) ABSTRACT

A grain-oriented electrical steel sheet for a stacked transformer core. The steel sheet having a sheet thickness t, where t and an iron loss deterioration ratio obtained by subjecting the steel sheet under elliptic magnetization satisfy the following relations: (i) when t≤0.20 mm, the iron loss deterioration ratio is 85% or less; (ii) when 0.20 mm<t<0.27 mm, the iron loss deterioration ratio is 80% or less; and (iii) when 0.27 mm≤t, the iron loss deterioration ratio is 75% or less. The iron loss deterioration ratio is calculated from $((W_A-W_B)/W_B) \times 100$, where $W_A$ is iron loss under 50 Hz
(Continued)

elliptic magnetization of 1.7 T in a rolling direction and 1.0 T in a direction orthogonal to the rolling direction, and $W_B$ is iron loss under 50 Hz alternating magnetization of 1.7 T in the rolling direction.

12 Claims, 8 Drawing Sheets

(51) Int. Cl.
    *C22C 38/00* (2006.01)
    *C22C 38/02* (2006.01)
    *C22C 38/04* (2006.01)
    *C22C 38/42* (2006.01)
    *C22C 38/44* (2006.01)
    *H01F 27/245* (2006.01)
    *H01F 41/02* (2006.01)

(52) U.S. Cl.
    CPC .............. *C22C 38/42* (2013.01); *C22C 38/44* (2013.01); *H01F 27/245* (2013.01); *H01F 41/0233* (2013.01); *C22C 2202/02* (2013.01)

(58) Field of Classification Search
    CPC ....... C22C 2202/02; H01F 1/147; H01F 1/16; H01F 41/0233; H01F 27/245; C21D 8/12
    See application file for complete search history.

(56) References Cited

U.S. PATENT DOCUMENTS

| 2017/0263357 | A1  | 9/2017 | Senda et al. |
| 2021/0043358 | A1* | 2/2021 | Inoue ....................... C21D 8/12 |

FOREIGN PATENT DOCUMENTS

| EP | 2 615 189 A1 | 7/2013 |
| EP | 2762578 A1 | 8/2014 |
| EP | 3 205 738 A1 | 8/2017 |
| JP | S54-84229 A | 7/1979 |
| JP | H01-283912 A | 11/1989 |
| JP | H0572252 B2 | 10/1993 |
| JP | H0672266 B2 | 9/1994 |
| JP | 2757724 B2 | 5/1998 |
| JP | 2005-240079 A | 9/2005 |
| JP | 2011-84778 A | 4/2011 |
| JP | 2012-57232 A | 3/2012 |
| JP | 2012-126973 A | 7/2012 |
| JP | 2013-108149 A | 6/2013 |
| JP | 5750820 B2 | 7/2015 |
| JP | 2017-145490 A | 8/2017 |
| WO | 2013/046716 A1 | 4/2013 |

OTHER PUBLICATIONS

Apr. 16, 2019 International Search Report issued in International Patent Application No. PCT/JP2019/003402.

Jul. 8, 2021 Office Action issued in Canadian Patent Application No. 3,088,125.

Feb. 4, 2021 Extended European Search Report issued in European Patent Application No. 19748059.3.

Minho Song et al; "A Generalized Chua-Type Vector Hysteresis Model for Both the Non-Oriented and Grain-Oriented Electrical Steel Sheets"; IEEE Transaction on Magnetics; vol. 47; No. 5; May 1, 2011; pp. 1146-1149.

* cited by examiner

STACKED THICKNESS: 15 mm
5 STEP LAPS
SINGLE LAYER LAP LENGTH 2 mm

TRANSFER MAGNETIC FLUX + (B) INTERLAMINAR MAGNETIC FLUX + (C) MAGNETIC FLUX CROSSING Gaps=MAGNETIC FLUX HAVING REACHED JOINT PORTION IN JOINT PORTION, (B) INTERLAMINAR MAGNETIC FLUX=1/2 x (A) TRANSFER MAGNETIC FLUX IN CONSIDERATION OF SYMMETRY OF MAGNETIC FLUX
(C) MAGNETIC FLUX CROSSING Gaps = MAGNETIC FLUX HAVING REACHED JOINT PORTION-3/2 x (A) TRANSFER MAGNETIC FLUX

GRAIN-ORIENTED ELECTRICAL STEEL SHEET, STACKED TRANSFORMER CORE USING THE SAME, AND METHOD FOR PRODUCING STACKED CORE

TECHNICAL FIELD

The present disclosure relates to a grain-oriented electrical steel sheet used for a stacked core of a transformer, to a stacked core of a transformer using the same, and to a method for producing the stacked core.

BACKGROUND

A grain-oriented electrical steel sheet having a crystal texture, in which the <001> orientation, an axis of easy magnetization of iron, are highly aligned with the rolling direction of the steel sheet, is used, in particular, as a core material of a power transformer. Transformers are broadly classified by their core structure into stacked core transformers and wound core transformers. The stacked core transformers have its core formed by stacking steel sheets sheared into a predetermined shape. The wound core transformers have its core formed by winding a steel sheet. The stacked core transformers, at present, are often used in large transformers. Although there are various features included in the transformer core, smaller iron loss is most desired.

From this point of view, important characteristics required for a grain-oriented electrical steel sheet used as a core material include small core loss. To reduce an exciting current in a transformer to thereby reduce copper loss, it is necessary that magnetic flux density be high. The magnetic flux density is evaluated using the magnetic flux density B8 (T) at a magnetizing force of 800 A/m. Generally, the higher the degree of accumulation into the Goss orientation, the higher the B8. Generally, the hysteresis loss of an electrical steel sheet having a high magnetic flux density is small, and such an electrical steel sheet is excellent also in iron loss characteristics. To reduce the iron loss of a steel sheet, it is important to highly align the crystal orientations of secondary recrystallized grains in the steel sheet with the Goss orientation and to reduce impurities in the steel composition. However, the control of crystal orientations and the reduction of impurities are limited. Therefore, a technique for reducing iron loss by introducing non-uniformity to the surface of a steel sheet using a physical method to subdivide the widths of magnetic domains, i.e., a magnetic domain refining technique, has been developed. For example, Patent Literature 1 proposes a technique for reducing iron loss by irradiating a final product sheet with laser beam to introduce high dislocation density regions into the surface of the steel sheet to thereby narrow the widths of magnetic domains. Patent Literature 2 proposes a technique for controlling the widths of magnetic domains by irradiation with an electron beam.

To reduce transformer iron loss, it is generally contemplated to reduce the iron loss of the grain-oriented electrical steel sheets used as the core material (the material iron loss). In a transformer core, particularly, a three-phase excitation wound core transformer having three-legged or five-legged grain-oriented electrical steel sheets, it is known that the iron loss in the transformer is larger compared to the material iron loss. A value obtained by dividing the iron loss value of a transformer using electrical steel sheets for the core of the transformer (transformer iron loss) by the iron loss value of the material obtained by the Epstein test is generally referred to as a building factor (BF) or a destruction factor (DF). Specifically, in a three-leg or five-legged three-phase excitation wound core transformer, the BF is generally larger than 1.

It has been pointed out that, in a stacked core transformer, reducing the iron loss of the core material does not always lead to a reduction in the transformer iron loss. In particular, it has been known that, in a stacked core using a raw material which has a B8 of 1.88 T or more and in which the degree of accumulation into the Goss orientation is high (highly grain-oriented electrical steel sheets: HGO), even when the magnetic properties of the raw material are good, the magnetic properties of the transformer itself may rather deteriorate. This means that, even when grain-oriented electrical steel sheets having excellent magnetic properties are produced, these magnetic properties are not fully utilized for the properties of actual transformers. As for properties of the raw material other than the magnetic flux density B8, changes in these properties such as the magnitude of the tension of the coating on the steel sheets, domain refining treatment, etc. cause the BF to change. Moreover, the BF is also changed by changing the shape of the transformer core and a stacking lap mode, and therefore the transformer iron loss is changed.

As a general knowledge, three main possible reasons that the transformer iron loss of a stacked transformer is higher than the material iron loss are i) an increase in iron loss due to magnetic flux waveform distortion generated in the core, ii) an increase in iron loss due to rotated magnetic flux generated in the core, and iii) an increase in iron loss due to an increase in in-plane eddy current loss caused by magnetic flux transfer in core joint portions.

The magnetic flux waveform distortion is a phenomenon in which the waveform of a magnetic flux density in the core is locally distorted from the excited magnetic flux density having a sine waveform. FIG. 1 shows an example of the magnetic flux waveform distortion that occurs in the transformer core. When the magnetic flux density is distorted, the change in the magnetic flux density with time becomes steeper than that when the magnetic flux density has the sine waveform at a certain time, and an eddy current caused by the change in the magnetic flux density increases. Therefore, when the magnetic flux density waveform is distorted, the eddy current loss per period is larger than that when the magnetic flux density has the sine waveform.

The rotated magnetic flux means that the magnetic flux is oriented in a direction other than the excitation direction (the rolling direction in the case of a grain-oriented electrical steel sheet). FIG. 2 shows a schematic illustration based on the actual measurement of magnetic flux flows in a core transformer. In the vicinity of a T joint portion, the magnetic flux is oriented in directions other than the rolling direction (RD), which is an easy magnetization direction. In this case, the iron loss is larger than that when the magnetic flux is excited only in the rolling direction.

A transformer core includes a joint portion in which steel sheets are lap-joined, as shown in FIG. 3. In the lap joint portion, a complicated magnetization behavior occurs, i.e., for example, the magnetic flux transfers steel sheet surfaces in a direction perpendicular thereto, and therefore the magnetic resistance increases. The increase in the in-plane eddy current loss due to magnetization occurring in an in-plane direction, the above-described magnetic flux waveform distortion, and the above-described rotated magnetic flux are large in the joint portion, and they also cause an increase in iron loss.

Based on the qualitative understanding of the causes of the increase in the transformer iron loss, the following proposals, for example, have been made to reduce the transformer iron loss.

Patent Literature 3 points out that the magnetic flux waveform distortion is large in a central leg and discloses that, by reducing the iron loss of the central leg so as to be lower than that in other portions, the transformer iron loss is effectively reduced. Patent Literature 4 points out that, in a material with a large magnetic flux density B8, the rotated magnetic flux is large in a T-shaped joint portion and discloses that, by subjecting a portion in which such a rotated magnetic flux occurs to surface processing, the transformer iron loss is effectively reduced. Patent Literature 5 shows the correlation between a lap length in a core joint portion and the transformer iron loss and discloses that the transformer iron loss can be reduced by optimizing the lap length.

CITATION LIST

Patent Literature

PTL 1: Japanese Examined Patent Application Publication No. 57-2252
PTL 2: Japanese Examined Patent Application Publication No. 6-72266
PTL 3: Japanese Unexamined Patent Application Publication No. 54-84229
PTL 4: Japanese Patent No. 2757724
PTL 5: Japanese Unexamined Patent Application Publication No. 1-283912
PTL 6: Japanese Patent No. 5750820

Non Patent Literature

NPL 1: Kawasaki steel technical report, Vol. 29, No. 3, P159-163(1997)
NPL 2: The transactions of the Institute of Electrical Engineers of Japan. D, Vol. 130, No. 9, P1087-1093 (2010)
NPL 3: The papers of technical meeting on magnetics, IEE Japan, MAG-04-224, P27-31(2004)

SUMMARY

Technical Problem

To reduce i) the magnetic flux waveform distortion, ii) the rotated magnetic flux, and iii) the increase in iron loss of the core joint portions as disclosed in Patent Literature 3 to Patent Literature 5, different countermeasures are taken. However, countermeasures taken against one cause of iron loss using a certain method in a specific transformer design may not be applicable to a different transformer design when the main cause of the increase or decrease in iron loss of the different transformer design differs from that in the specific transformer design. Suppose, for example, that the iron loss can be reduced sufficiently using these design methods. However, with the methods, transformer productivity deteriorates significantly because different steel sheets are used only for the central leg in order to reduce the iron loss of the central leg, because the T-shaped joint portion is subjected to surface processing, and because the lap length is optimized.

An object of the present disclosure is to provide a grain-oriented electrical steel sheet that exhibits an excellent transformer iron loss reducing effect when used for a stacked core of a transformer. Another object of the present disclosure is to provide a stacked core of a transformer that uses the grain-oriented electrical steel sheet and a method for producing the stacked core.

Solution to Problem

The present inventors conducted detailed studies on the main causes of the increase or decrease in the transformer iron loss, i.e., i) the magnetic flux waveform distortion, ii) the rotated magnetic flux, and iii) the increase in iron loss of the core joint portions. Specifically, the present inventors have studied what material factor increases or decreases each of these causes.

The magnetic flux waveform distortion and the rotated magnetic flux were examined by measuring local magnetic flux in an excited transformer core by a probe method (Non Patent Literature 1). Grain-oriented electrical steel sheets (subjected to linear strain-introducing magnetic domain refining treatment) having a thickness of 0.23 mm and a magnetic flux density B8 of 1.92 T at a magnetizing force of 800 A/m were used to produce a three-phase stacked transformer core shown in FIG. 4. An electromotive voltage generated between probes was measured at 5 mm intervals in two directions over the entire core surface under three-phase excitation at 50 Hz and 1.7 T to thereby obtain a two-dimensional temporal magnetic flux density waveform. The three-phase stacked transformer core shown in FIG. 4 has a shape with a stacked thickness of 15 mm, 5 step laps, and a single layer lap length of 2 mm.

In this case, the magnetic flux waveform distortion was large in leg portions and widthwise ends of yoke portions. More specifically, it was found that the distorted waveform different from the sine wave has a trapezoidal shape, as shown in FIG. 1. As general knowledge, an indicator representing the degree of distortion of the magnetic flux waveform is a form factor defined by formula (3) below. As the form factor increases in a certain portion, the degree of increase in iron loss of that portion increases.

[Math 1]

$$\text{Form factor} = \frac{(dB/dt)_{rms}/(dB/dt)_{ave}}{1.11} \quad (3)$$

Here, (dB/dt) is a value obtained by differentiating a local magnetic flux density B(T) with respect to time t (second), $(dB/dt)_{rms}$ is the root mean square of (dB/dt), and $(dB/dt)_{ave}$ is the simple average of (dB/dt).

It was also found that the rotated magnetic flux was large in the leg portions, widthwise central portions of the yoke portions, and the vicinities of T joint portions. These results are the same as the previous findings. It was also found that, in these portions, the shift in phase between the rolling direction and a direction orthogonal to the rolling direction when the magnetic flux density becomes maximum is 90° and therefore so-called elliptic magnetization was formed. The larger the maximum magnetic flux density in the direction orthogonal to the rolling direction in a certain portion, the larger the increase in iron loss of that portion. The maximum magnetic flux density in the direction orthogonal to the rolling direction may be used as an indicator of the magnitude of the rotated magnetic flux generated in the core.

Next, the increase in iron loss of a core joint portion was examined. Magnetic flux transfer that occurs in joint laps cannot be measured by the evaluation of in-plane magnetization using the probe method. Therefore, a search coil was formed in a joint portion by vapor deposition using a method shown in Non Patent Literature 2, and a transfer magnetic flux density generated in the joint laps was measured. The iron loss of this portion was examined by local iron loss measurement that uses an infrared camera and is disclosed in Patent Literature 6. In the search coil measurement, the transfer magnetic flux density measured in lap portions was 0.14 T at the maximum. Accordingly, in the joint portion, the iron loss was increased by 0.4 W/kg on average over the joint portion as compared with the material iron loss of the grain-oriented electrical steel sheets.

Grain-oriented electrical steel sheets having the core shape in FIG. 4, a magnetic flux density B8 of 1.91 T at a magnetizing force of 800 A/m, a thickness of 0.20 mm, 0.23 mm, or 0.27 mm were used to produce transformer cores with different lap joint lengths from 1 to 3 mm. Under three-phase excitation at 50 Hz and 1.7 T, the magnetization state in each joint portion of each transformer was examined using a search coil, and the iron loss immediately above each joint lap, the iron loss of each transformer core, and the BF were examined using the probe method described above. From the results for the magnetization state in the transformer, the average value of form factors at the measurement points was computed as an indicator of the degree of waveform distortion, and the average value of maximum magnetic flux densities in the direction orthogonal to the rolling direction at the measurement points was computed as an indicator of the rotated magnetic flux. Moreover, the maximum value of the transfer magnetic flux density in one excitation period measured in the search coil measurement was computed. The results are shown in Table 1.

portions), and (C) magnetic flux crossing Gaps (between steel sheets) (In FIG. 5, the magnetic flux that has reached the joint portion=(A) the transfer magnetic flux+(B) the interlaminar magnetic flux+(C) the magnetic flux crossing the Gaps). As the lap joint length decreases, the area of the lap portions decreases, so that (A) the transfer magnetic flux decreases. Similarly, as the sheet thickness increases, the number of stacked sheets at a given stacking thickness in the core decreases, and the area of the lap portions relative to the volume of the joint portion decreases accordingly, so that (A) the transfer magnetic flux decreases. In a step lap joint, (B) the interlaminar magnetic flux is about one half of (A) the transfer magnetic flux because of the symmetry of (B) the interlaminar magnetic flux (in a lap joint, in consideration of the symmetry of the magnetic flux, (B) the interlaminar magnetic flux=(A) the transfer magnetic flux×½, and (C) the magnetic flux crossing the Gaps=the magnetic flux that has reached the joint portion−(A) the transfer magnetic flux×3/2). Therefore, as the lap joint length decreases or as the sheet thickness increases, (A) the transfer magnetic flux decreases, and (C) the magnetic flux crossing the Gaps increases inevitably. Using formulas in FIG. 5 and the area of the joint portions, (C) the magnetic flux crossing the Gaps can be computed. By dividing this value by the cross sectional area of the joint Gaps, the magnetic flux density crossing the Gaps can be computed. FIG. 6 shows the relation between the magnetic flux density crossing the Gaps and the BF. It was newly found that the correlation between the magnetic flux density crossing the Gaps and the BF is very high.

From the viewpoint of the magnetic resistance of the joint portion, the above correlation may be due to the following reasons. The width of the Gap portions is generally larger

| | Core production conditions | | Magnetization state in transformer | | | Iron loss | | | |
|---|---|---|---|---|---|---|---|---|---|
| Condition | Sheet thickness | Lap joint length | Form factor | Maximum magnetic flux density in direction orthogonal to rolling direction (T) | Transfer magnetic flux density (T) | directly above joint portion (W/kg) | Material iron loss (W/kg) | Transformer iron loss (W/kg) | BF |
| 1 | 0.20 mm | 1 mm | 1.18 | 0.30 | 0.14 | 1.12 | 0.69 | 0.91 | 1.32 |
| 2 | 0.20 mm | 2 mm | 1.14 | 0.28 | 0.15 | 1.06 | 0.69 | 0.86 | 1.25 |
| 3 | 0.20 mm | 3 mm | 1.13 | 0.27 | 0.11 | 1.05 | 0.69 | 0.85 | 1.23 |
| 4 | 0.23 mm | 1 mm | 1.19 | 0.31 | 0.16 | 1.21 | 0.73 | 0.96 | 1.32 |
| 5 | 0.23 mm | 2 mm | 1.15 | 0.29 | 0.17 | 1.19 | 0.73 | 0.92 | 1.26 |
| 6 | 0.23 mm | 3 mm | 1.14 | 0.27 | 0.13 | 1.17 | 0.73 | 0.90 | 1.23 |
| 7 | 0.27 mm | 1 mm | 1.22 | 0.34 | 0.17 | 1.45 | 0.83 | 1.11 | 1.34 |
| 8 | 0.27 mm | 2 mm | 1.16 | 0.28 | 0.18 | 1.38 | 0.83 | 1.06 | 1.28 |
| 9 | 0.27 mm | 3 mm | 1.14 | 0.27 | 0.14 | 1.37 | 0.83 | 1.04 | 1.25 |

As the lap joint length decreases or as the sheet thickness increases, the transformer iron loss and the BF (=the transformer iron loss/the material iron loss) increase. Moreover, as the lap joint length decreases or as the sheet thickness increases, the form factor, the maximum magnetic flux density in the direction orthogonal to the rolling direction, the transfer magnetic flux density, and the iron loss directly above the joint portion increase. In consideration of the magnetic flux density crossing Gaps in the joint portion, the reason for this may be as follows.

FIG. 5 schematically shows the flows of the magnetic flux in a joint portion that are estimated based on Non Patent Literature 2. On the assumption that no magnetic flux leaks to the outside of the steel sheets, the magnetic flux reaching the joint portion can be divided into (A) transfer magnetic flux (that transfers lap portions in an out-of-plane direction), (B) interlaminar magnetic flux (that transfers spaces between stacked steel sheets in portions other than the lap portions), and (C) magnetic flux crossing Gaps (between steel sheets in the stacking direction (the thickness of surface coatings on the electrical steel sheets (about several micrometers)), but this depends on the accuracy of assembly. The magnetic resistance for (C) the magnetic flux crossing the Gaps may be larger than the magnetic resistance for (A) the transfer magnetic flux and the magnetic resistance for (B) the interlaminar magnetic flux. Therefore, as the magnetic flux density crossing the Gaps increases, the magnetic resistance of the joint portion may increase. It is inferred that the increase in the magnetic resistance of the joint portion directly causes the iron loss of the joint portion to increase largely, and, at the same time, the magnetic flux waveform distortion (waveform ratio) in the core and the rotated magnetic flux (the maximum magnetic flux density in the direction orthogonal to the rolling direction) are increased according to the logic described below. As the magnetic flux waveform distortion (form factor) and the rotated magnetic flux (the maximum magnetic flux density in the direction orthogonal to the rolling direction) increase, the iron loss increases accordingly, and this may result in an increase in the transformer iron loss and an increase in the BF.

FIG. 7 shows a schematic illustration of magnetic flux flows in a three-phase three-leg core at a certain moment (at the moment when a U-leg and a V-leg are excited and a W-leg is not excited). In addition to the magnetic flux flow between the U-leg and the V-leg, the magnetic flux flows into the non-excited W-leg. This phenomenon is significant when a material with high permeability anisotropy such as grain-oriented electrical steel sheets is used for the core. For example, in the core shown in FIG. 7, the lengthwise direction of the grain-oriented electrical steel sheets is their easy magnetization direction RD (rolling direction). Since the magnetic flux easily flows in the RD, the magnetic flux flows also into the W-leg. The magnetic resistance of joint portions is related to the magnetic flux flowing into the leg other than the excited legs. When the magnetic resistance of each of the joint portions is large, the magnetic flux flow between the U and V legs, which is a main magnetic flux flow, is impeded, so that the magnetic flux flowing into the W-leg increases. Rotated magnetic flux in yoke central portions in a direction orthogonal to the rolling direction is caused by diversion of the magnetic flux flowing into the leg other than the excited legs. Therefore, as the amount of the magnetic flux flowing into the leg other than the excited legs increases, the maximum magnetic flux density in the yoke central portions in the direction orthogonal to the rolling direction may increase. Moreover, as the magnetic flux flows into the unexcited W-leg, the magnetic flux waveform is distorted in leg end portions according to the amount of the flow, and the form factor becomes large in the leg end portions. Specifically, it is inferred that, when the magnetic resistance of each joint portion is large, the magnetic flux waveform distortion (form factor) and the rotated magnetic flux (the maximum magnetic flux density in the direction orthogonal to the rolling direction) increase.

Based on the above experimental facts, it was found that to reduce the iron loss and the BF in a stacked transformer, it is important to reduce the magnetic flux density crossing the Gaps. Moreover, to reduce the magnetic flux density crossing the Gaps, it may be important to increase the amount of the magnetic flux transferring the lap portions. One method to increase the amount of the magnetic flux crossing the lap portions is to change the design of the transformer core such that the lap length is increased to increase the area of the lap portions. Another method is to reduce the sheet thickness to increase the number of lap regions to thereby increase the area of the lap portions per unit volume of the joint portions or to use a material having a large permeability for the transfer magnetic flux in the lap portions. In the present disclosure, to produce a transformer having excellent iron loss characteristics irrespective of the design of the transformer core, a search for a material that allows the permeability for the transfer magnetic flux in the lap portions to increase when the material is formed into the transformer core was made in consideration of the effect of the sheet thickness.

The relation between the magnetic flux density transferring the lap portions of the joint portions and material magnetic properties was examined for various materials. In the examination, as in the experiment described above, transformer cores having the design in FIG. 4 (lap length: 2 mm) were produced using different grain-oriented electrical steel sheets, and the magnetic flux density transferring the lap portions was measured using search coils. Moreover, the Epstein test and an SST test (a single sheet magnetic property test for electrical steel sheets) were used for evaluation under uniaxial magnetization of a grain-oriented electrical steel sheet in its rolling direction, i.e., the easy magnetization direction. In addition, evaluation under biaxial magnetization was performed using a two-dimensional magnetic measurement device shown in Non Patent Literature 3, and the correlation between the magnetic properties and the magnetic flux density transferring the lap portions was examined under various excitation conditions. Then it was found that the correlation between an iron loss deterioration ratio obtained by subjecting grain-oriented electrical steel sheets used as a raw material under elliptic magnetization defined by formula (1) below and the magnetic flux density transferring the lap portions of a transformer core produced using the grain-oriented electrical steel sheets is high.

(Iron loss deterioration ratio under elliptic magnetization)=$((W_A-W_B)/W_B) \times 100$ (1)

Here, $W_A$ in formula (1) is the iron loss under 50 Hz elliptic magnetization of 1.7 T in an RD direction (rolling direction) and 1.0 T in a TD direction (a direction orthogonal to the rolling direction), and $W_B$ is the iron loss under 50 Hz alternating magnetization of 1.7 T in the RD direction.

As for the grain-oriented electrical steel sheets (raw materials), FIG. 8 shows the results for a 0.18 mm-thick material, FIG. 9 shows the results for a 0.20 mm-thick material, FIG. 10 shows the results for a 0.23 mm-thick material, FIG. 11 shows the results for a 0.27 mm-thick material, and FIG. 12 shows the results for a 0.30 mm-thick material. At any thickness, as the iron loss deterioration ratio when the grain-oriented electrical steel sheets forming the core were subjected to elliptic magnetization increased, the magnetic flux density transferring the lap portions of the core decreased. In particular, in the 0.18 mm-thick material and the 0.20 mm-thick material, when the iron loss deterioration ratio under the elliptic magnetization was more than 85%, the reduction in the magnetic flux density transferring the lap portions was significant. In the 0.23 mm-thick material, when the iron loss deterioration ratio was more than 80%, the reduction in the magnetic flux density transferring the lap portions was significant. In the 0.27 mm-thick material and the 0.30 mm-thick material, when the iron loss deterioration ratio was more than 75%, the reduction in the magnetic flux density transferring the lap portions was significant. As described above, as the magnetic flux density transferring the lap portions decreases, the magnetic flux density crossing the Gaps, which is disadvantageous for the transformer iron loss, increases, and this is unsuitable.

Although the reason for the correlation between the iron loss deterioration ratio under the elliptic magnetization and the magnetic flux density transferring the lap portions is not clear, the present inventors think that the reason is as follows. When magnetic flux transfers steel sheets in an out-of-plane direction, magnetic poles are formed at the interfaces between the steel sheets, and this causes a very large increase in magnetostatic energy. Then the magnetization state is changed such that a demagnetizing field is generated in an out-of-plane direction in order to reduce the magnetostatic energy. Specifically, it is inferred that an increase in the number of lancet domain structures in the steel sheets, generation of a demagnetizing field at crystal grain boundaries, etc. occur. In the case of a magnetic domain refined material, it is inferred that an increase in the number of closure domains induced in strain-introduced portions occur. The change in the magnetization state may cause the magnetic flux density transferring the lap portions to decrease. Under elliptic magnetization in an in-plane direction, the magnetization direction is momentarily oriented in a <111> direction, which is a hard magnetization direction. When excitation is performed under large elliptic magnetization of 1.7 T in the RD direction and 1.0 T in the TD direction, magnetic anisotropy energy is very large at the moment when the magnetization direction of main magnetic domains rotates in a steel sheet plane from the easy magnetization direction to the hard magnetization direction, and therefore the magnetization state is changed such that a demagnetizing field is generated so as to reduce the magnetic anisotropy energy. In this case, as in the case of the transfer magnetic flux in an out-of-plane direction, the number of lancet domain structures in the steel sheets increases, and a demagnetizing field is generated at crystal grain boundaries. In a magnetic domain refined material, the number of closure domains induced in strain-introduced portions increases. Therefore, the iron loss under elliptic magnetization increases more significantly than the iron loss under alternating magnetization only in the easy magnetization direction. Specifically, it is inferred that the iron loss deterioration ratio under elliptic magnetization is correlated with a change in the magnetic flux density transferring the lap portions because of the same change factor, i.e., the generation of the demagnetizing field.

It is contemplated from the above idea that the magnitude of the magnetic flux density transferring the lap portions or the magnitude of the iron loss under elliptic magnetization can be estimated by parameterizing factors such as an increase in the number of lancet domain structures in the steel sheets, the generation of a demagnetizing field at the crystal grain boundaries, and, in a magnetic domain refined material, an increase in the number of closure domains induced in the strain-introduced portions. Specifically, (i) A parameter indicating the amount of lancet domain structures in the steel sheets: $\sin \beta$ $\beta$: average $\beta$ angle (°) of secondary recrystallized grains As the average $\beta$ angle of the secondary recrystallized grains increases, the magnetostatic energy increases in proportion to $\sin \beta$, and the amount of the lancet domain structures may increase to reduce the magnetostatic energy.

(ii) Generation of demagnetizing field at crystal grain boundaries: $4t/R$ t: steel sheet thickness (mm)

R: diameter of secondary recrystallized grains (mm)

The demagnetizing field generated at the grain boundaries may increase according to the grain boundary area ratio per unit steel sheet area $4t/R$.

(iii) Increase in number of closure domains induced in strain-introduced portions $(w/a/\sqrt{2}) \times 10^{-3}$ w: closure domain width (μm)

a: intervals (mm) between a plurality of linear strains extending in a direction intersecting the rolling direction When the width of the closure domains increases to the width of the closure domains in a static magnetic field state, the closure domain area ratio per unit area of the steel sheets is $(w/a) \times 10^{-3}$. Accordingly, the demagnetizing field generated by the closure domains may increase in proportion to $w/a/\sqrt{2}$.

A parameter obtained by summing the three factors, $\sin \beta + 4t/R + (w/a/\sqrt{2}) \times 10^{-3}$, was used to classify the iron loss deterioration ratios of materials under elliptic magnetization, these materials having thicknesses of 0.18 mm to 0.30 mm and various different material factors. The material factors and the measurement results are summarized in Table 2, and the relation between the disclosed parameter [$\sin \beta + 4t/R + (w/a/\sqrt{2}) \times 10^{-3}$] and the iron loss deterioration ratio is summarized in FIG. 13. As shown in FIG. 13, as the disclosed parameter increases, the iron loss deterioration ratio under elliptic magnetization decreases. Moreover, it was found that, to allow the iron loss deterioration ratio to fall within a range in which the magnetic flux density transferring the lap portions falls within a preferred range at any sheet thickness, the disclosed parameter is 0.080 or more.

As described above, in a stacked core using a raw material which has a large magnetic flux density B8 at a magnetizing force of 800 A/m, i.e., in which the degree of accumulation into the Goss orientation is high, even when the magnetic properties of the raw material are good, the magnetic properties of the transformer itself may rather deteriorate. In particular, it has been pointed out that, in a stacked core using grain-oriented electrical steel sheets which have a B8 of 1.94 T or more and in which the degree of accumulation into the Goss orientation is very high, the rotated magnetic flux is high in T joint portions, as described in Patent Literature 4. A large B8 is advantageous for reducing the iron loss of the raw material. However, this causes the BF to increase, so that the iron loss of the transformer is usually not reduced.

Moreover, in a raw material which has a large B8 and in which the degree of accumulation into the Goss orientation is very high, the secondary recrystallized grains tend to be coarse, and the diameter R of the secondary recrystallized grains can be as large as 40 mm or more. In this case, the demagnetizing field generated at the crystal grain boundaries is small, and the iron loss deterioration ratio under elliptic magnetization is large as described above, so that the BF increases.

However, by controlling the disclosed parameter within the range of 0.080 or more, the BF can be reduced even when the B8 is 1.94 T or more and the diameter R of the secondary recrystallized grains is 40 mm or more. Therefore, by controlling the B8 to 1.94 T or more, the diameter R of the secondary recrystallized grains to 40 mm or more, and the disclosed parameter within the range of 0.080 or more, grain-oriented electrical steel sheets in which the magnetic property (iron loss) of the raw material is very small, which allow the BF to be small, and which can form a transformer with very small iron loss can be provided.

TABLE 2

| Condition | $\beta$: Average $\beta$ angle of secondary recrystalized grains (°) | t: Steel sheet thickness (mm) | R: Secondary recrystallized grain diameter (mm) | w: Closure domain width (μm) | a: Intervals between plurality of linear strains extending in direction intersecting rolling direction (mm) | Disclosed paramete[*1] | $W_B$[*2] (W/kg) | $W_A$[*3] (Wkg) | Iron loss deterioration ratio[*4] (%) |
|---|---|---|---|---|---|---|---|---|---|
| 1 | 2.5 | 0.18 | 10 | 200 | 4 | 0.151 | 0.60 | 0.89 | 48 |
| 2 | 2.7 | 0.18 | 12 | 200 | 5 | 0.135 | 0.62 | 0.99 | 60 |
| 3 | 2.5 | 0.18 | 11 | 180 | 7.5 | 0.126 | 0.63 | 1.02 | 62 |
| 4 | 2.4 | 0.18 | 11 | 150 | 8 | 0.121 | 0.62 | 1.06 | 71 |
| 5 | 2.3 | 0.18 | 10 | 150 | 10 | 0.123 | 0.63 | 1.08 | 71 |

TABLE 2-continued

| Condition | β: Average β angle of secondary recrystalized grains (°) | t: Steel sheet thickness (mm) | R: Secondary recrystallized grain diameter (mm) | w: Closure domain width (μm) | a: Intervals between plurality of linear strains extending in direction intersecting rolling direction (mm) | Disclosed parameter[*1] | $W_B$[*2] (W/kg) | $W_A$[*3] (W/kg) | Iron loss deterioration ratio[*4] (%) |
|---|---|---|---|---|---|---|---|---|---|
| 6 | 2.2 | 0.18 | 13 | 150 | 10 | 0.104 | 0.63 | 1.14 | 81 |
| 7 | 2.5 | 0.18 | 15 | 100 | 12 | 0.098 | 0.64 | 1.16 | 81 |
| 8 | 2.4 | 0.18 | 19 | 100 | 12 | 0.086 | 0.63 | 1.16 | 84 |
| 9 | 2.1 | 0.18 | 21 | 80 | 8 | 0.078 | 0.62 | 1.16 | 87 |
| 10 | 2.0 | 0.18 | 20 | 50 | 12 | 0.074 | 0.62 | 1.19 | 92 |
| 11 | 2.6 | 0.20 | 8 | 250 | 4 | 0.190 | 0.64 | 0.90 | 41 |
| 12 | 2.7 | 0.20 | 12 | 220 | 6 | 0.140 | 0.65 | 0.97 | 49 |
| 13 | 2.1 | 0.20 | 12 | 230 | 8 | 0.124 | 0.66 | 1.02 | 55 |
| 14 | 2.3 | 0.20 | 13 | 180 | 9 | 0.116 | 0.66 | 1.05 | 59 |
| 15 | 2.1 | 0.20 | 14 | 180 | 10 | 0.107 | 0.66 | 1.08 | 64 |
| 16 | 2.2 | 0.20 | 15 | 150 | 10 | 0.102 | 0.65 | 1.12 | 72 |
| 17 | 2.4 | 0.20 | 16 | 100 | 11 | 0.098 | 0.65 | 1.18 | 82 |
| 18 | 2.1 | 0.20 | 20 | 100 | 11 | 0.083 | 0.66 | 1.21 | 83 |
| 19 | 1.8 | 0.20 | 25 | 80 | 8 | 0.070 | 0.66 | 1.24 | 88 |
| 20 | 1.8 | 0.20 | 27 | 70 | 12 | 0.065 | 0.66 | 1.28 | 94 |
| 21 | 2.2 | 0.23 | 9 | 260 | 4 | 0.187 | 0.67 | 0.95 | 42 |
| 22 | 2.3 | 0.23 | 13 | 240 | 6 | 0.139 | 0.68 | 1.02 | 50 |
| 23 | 2.4 | 0.23 | 14 | 220 | 6 | 0.134 | 0.69 | 1.05 | 52 |
| 24 | 2.2 | 0.23 | 15 | 190 | 8 | 0.117 | 0.68 | 1.13 | 66 |
| 25 | 2.5 | 0.23 | 17 | 190 | 10 | 0.111 | 0.68 | 1.15 | 69 |
| 26 | 2.6 | 0.23 | 16 | 120 | 12 | 0.110 | 0.70 | 1.19 | 70 |
| 27 | 2.1 | 0.23 | 18 | 100 | 11 | 0.094 | 0.70 | 1.21 | 73 |
| 28 | 1.9 | 0.23 | 22 | 100 | 11 | 0.081 | 0.69 | 1.23 | 78 |
| 29 | 1.9 | 0.23 | 26 | 70 | 10 | 0.073 | 0.70 | 1.27 | 81 |
| 30 | 1.8 | 0.23 | 28 | 70 | 13 | 0.068 | 0.70 | 1.30 | 86 |
| 31 | 2.5 | 0.27 | 8 | 260 | 5 | 0.215 | 0.81 | 1.15 | 42 |
| 32 | 2.3 | 0.27 | 10 | 200 | 5 | 0.176 | 0.81 | 1.20 | 48 |
| 33 | 2.2 | 0.27 | 14 | 210 | 6 | 0.140 | 0.82 | 1.24 | 51 |
| 34 | 2.4 | 0.27 | 15 | 180 | 6 | 0.135 | 0.82 | 1.26 | 54 |
| 35 | 2.3 | 0.27 | 17 | 190 | 8 | 0.120 | 0.83 | 1.32 | 59 |
| 36 | 2.5 | 0.27 | 18 | 140 | 8 | 0.116 | 0.83 | 1.35 | 63 |
| 37 | 1.5 | 0.27 | 15 | 135 | 10 | 0.108 | 0.82 | 1.39 | 70 |
| 38 | 1.8 | 0.27 | 25 | 120 | 10 | 0.083 | 0.83 | 1.43 | 72 |
| 39 | 2.1 | 0.27 | 28 | 60 | 12.5 | 0.079 | 0.82 | 1.45 | 77 |
| 40 | 1.8 | 0.27 | 25 | 60 | 12.5 | 0.078 | 0.82 | 1.48 | 80 |
| 41 | 2.2 | 0.30 | 12 | 250 | 4 | 0.183 | 0.91 | 1.32 | 45 |
| 42 | 2.1 | 0.30 | 11 | 250 | 5 | 0.181 | 0.92 | 1.34 | 46 |
| 43 | 1.9 | 0.30 | 15 | 220 | 6 | 0.139 | 0.93 | 1.41 | 52 |
| 44 | 2.3 | 0.30 | 19 | 220 | 6 | 0.129 | 0.93 | 1.47 | 58 |
| 45 | 2.2 | 0.30 | 23 | 180 | 8 | 0.106 | 0.91 | 1.48 | 63 |
| 46 | 2.1 | 0.30 | 25 | 100 | 8 | 0.093 | 0.92 | 1.54 | 67 |
| 47 | 1.7 | 0.30 | 27 | 100 | 10 | 0.081 | 0.94 | 1.64 | 74 |
| 48 | 1.6 | 0.30 | 31 | 120 | 11 | 0.074 | 0.96 | 1.69 | 76 |
| 49 | 1.9 | 0.30 | 36 | 80 | 12 | 0.071 | 0.95 | 1.70 | 79 |
| 50 | 1.8 | 0.30 | 38 | 80 | 12 | 0.068 | 0.96 | 1.75 | 82 |

[*1] $\sin\beta + 4t/R + (w/a/\sqrt{2}) \times 10^{-3}$: underlines indicate that the disclosed prameter is not satisfied.
[*2] Iron loss under 50 Hz alternating magnetization of 1.7 T in RD direction
[*3] Iron loss under 50 Hz elliptic magnetism of 1.7 T in RD direction and 1.0 T in TD direction
[*4] $((W_A - W_B)/(W_B)) \times 100$ Iron loss deterioration ratio under elliptic magnetization: underlined values are outside the range of disclosure.

The present disclosure has been completed based on the above findings. Specifically, the disclosed embodiments have the following structures.

[1] A grain-oriented electrical steel sheet used for a stacked core of a transformer,
wherein a sheet thickness t of the steel sheet and an iron loss deterioration ratio obtained by subjecting the steel sheet under elliptic magnetization defined by formula (1) below satisfy the following relations:
when the sheet thickness t≤0.20 mm, the iron loss deterioration ratio is 85% or less;
when 0.20 mm< the sheet thickness t<0.27 mm, the iron loss deterioration ratio is 80% or less; and
when 0.27 mm the sheet thickness t, the iron loss deterioration ratio is 75% or less, and wherein (the iron loss deterioration ratio under the elliptic magnetization)=$((W_A-W_B)/W_B)\times 100$ (1)

wherein, in formula (1), $W_A$ is iron loss under 50 Hz elliptic magnetization of 1.7 T in an RD direction (a rolling direction) and 1.0 T in a TD direction (a direction orthogonal to the rolling direction), and $W_B$ is iron loss under 50 Hz alternating magnetization of 1.7 T in the RD direction.

[2] The grain-oriented electrical steel sheet according to [1], wherein a plurality of linear strains extending in a direction intersecting the rolling direction are formed on a surface of the steel sheet, and
wherein the width w of closure domains formed by the strains, the diameter R of secondary recrystallized grains in the steel sheet, and an average β angle of the secondary recrystallized grains in the steel sheet satisfy the relation represented by the following formula (2):

[Math. 2]

$$\sin\beta + 4t/R + (w/a/\sqrt{2})\times 10^{-3} \geq 0.080, \quad (2)$$

wherein, in formula (2),
β: the average β angle (°) of the secondary recrystallized grains,
t: the thickness (mm) of the steel sheet, R: the diameter (mm) of the secondary recrystallized grains, w: the width (µm) of the closure domains, and a: the intervals (mm) between the plurality of linear strains extending in the direction intersecting the rolling direction.

[3] The grain-oriented electrical steel sheet according to [1] or [2], wherein a magnetic flux density B8 at a magnetizing force of 800 A/m is 1.94 T or more, and the diameter R of the secondary recrystallized grains is 40 mm or more.

[4] A stacked core of a transformer, the stacked core being formed using the grain-oriented electrical steel sheet according to any of [1] to [3].

[5] A method for producing a stacked core of a stacked core transformer, the method allowing a building factor to be reduced, the building factor being obtained by dividing the value of iron loss of the stacked core transformer by the value of iron loss of grain-oriented electrical steel sheets used as a raw material of the stacked core, wherein, in the grain-oriented electrical steel sheets used to form the stacked core by stacking the grain-oriented electrical steel sheets, the sheet thickness t of each of the grain-oriented electrical steel sheets and an iron loss deterioration ratio obtained by subjecting the grain-oriented electrical steel sheets under elliptic magnetization defined by formula (1) below satisfy the following relations:

when the sheet thickness t≤0.20 mm, the iron loss deterioration ratio is 85% or less;

when 0.20 mm< the sheet thickness t<0.27 mm, the iron loss deterioration ratio is 80% or less; and when 0.27 mm the sheet thickness t, the iron loss deterioration ratio is 75% or less, and $$\text{(the iron loss deterioration ratio under the elliptic magnetization)} = ((W_A - W_B)/W_B) \times 100, \quad (1)$$

wherein, in formula (1), $W_A$ is iron loss under 50 Hz elliptic magnetization of 1.7 T in an RD direction (a rolling direction) and 1.0 T in a TD direction (a direction orthogonal to the rolling direction), and $W_B$ is iron loss under 50 Hz alternating magnetization of 1.7 T in the RD direction.

[6] The method for producing a stacked core according to [5], wherein a plurality of linear strains extending in a direction intersecting the rolling direction are formed on a surface of each of the steel sheets, and wherein the width w of closure domains formed by the strains, the diameter R of secondary recrystallized grains in the steel sheets, and an average β angle of the secondary recrystallized grains in each of the steel sheets satisfy the relation represented by the following formula (2):

[Math. 3]

$$\sin \beta + 4t/R + (w/a/\sqrt{2}) \times 10^{-3} \geq 0.080, \quad (2)$$

wherein, in formula (2),

β: the average β angle (°) of the secondary recrystallized grains, t: the thickness (mm) of each of the steel sheets, R: the diameter (mm) of the secondary recrystallized grains, W: the width (µm) of the closure domains, and a: the intervals (mm) between the plurality of linear strains extending in the direction intersecting the rolling direction.

[7] The method for producing a stacked core according to [5] or [6], wherein, in the grain-oriented electrical steel sheets used, a magnetic flux density B8 at a magnetizing force of 800 A/m is 1.94 T or more, and the diameter R of the secondary recrystallized grains is 40 mm or more.

Advantageous Effects

According to the present disclosure, a grain-oriented electrical steel sheet that, when used for a stacked core of a transformer, is excellent in the effect of reducing transformer iron loss.

In the present disclosure, by controlling the properties of the grain-oriented electrical steel sheets used for the stacked core of the transformer, the magnetic resistance of lap joint portions can be reduced, and the transformer iron loss of the stacked core transformer can be reduced irrespective of the design of the transformer core.

In the present disclosure, when a stacked core of a stacked core transformer is formed using, as a raw material, the grain-oriented electrical steel sheets of the present disclosure, the stacked core transformer obtained has a small building factor.

DETAILED DESCRIPTION

Figure 1:
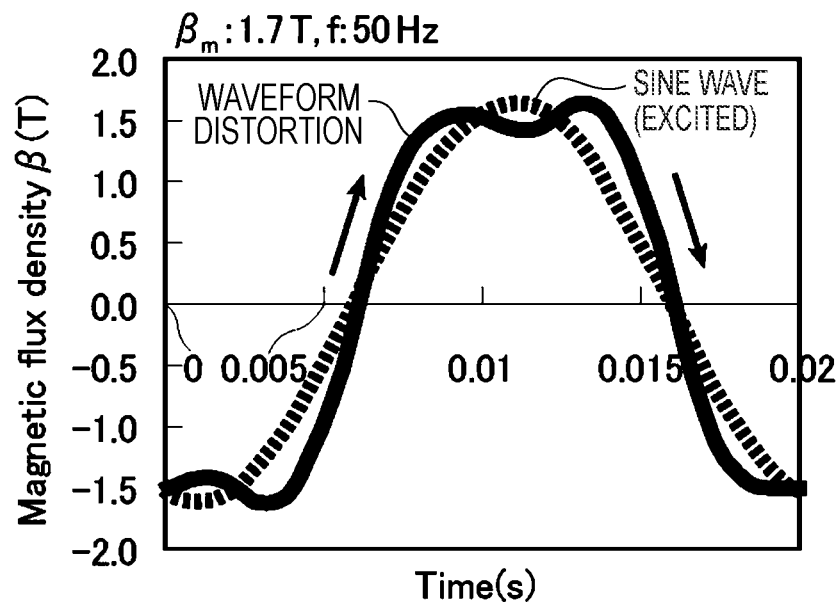
FIG. 1 is an illustration showing an example of magnetic flux waveform distortion that occurs in a transformer core.
Figure 2:
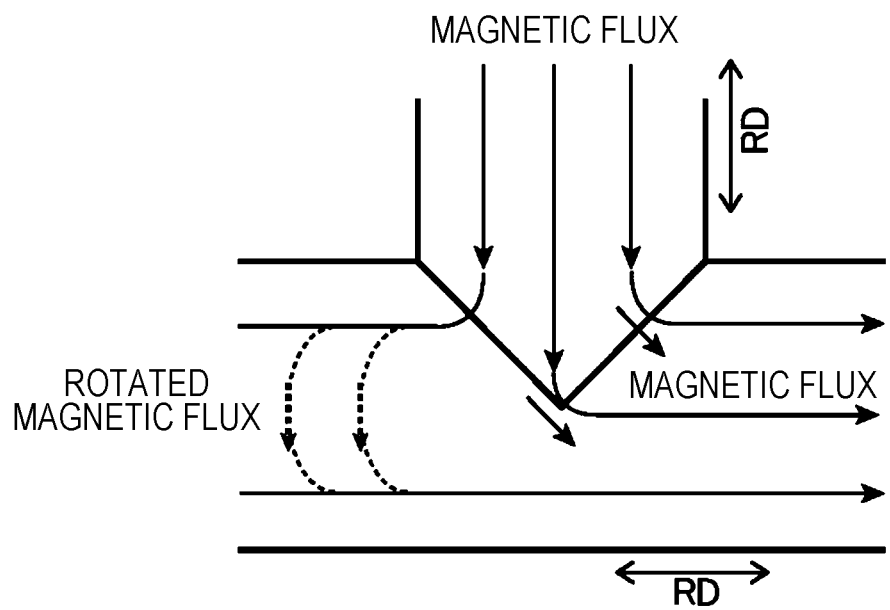
FIG. 2 is a schematic illustration showing magnetic flux flows in a core based on actual measurement.
Figure 3:
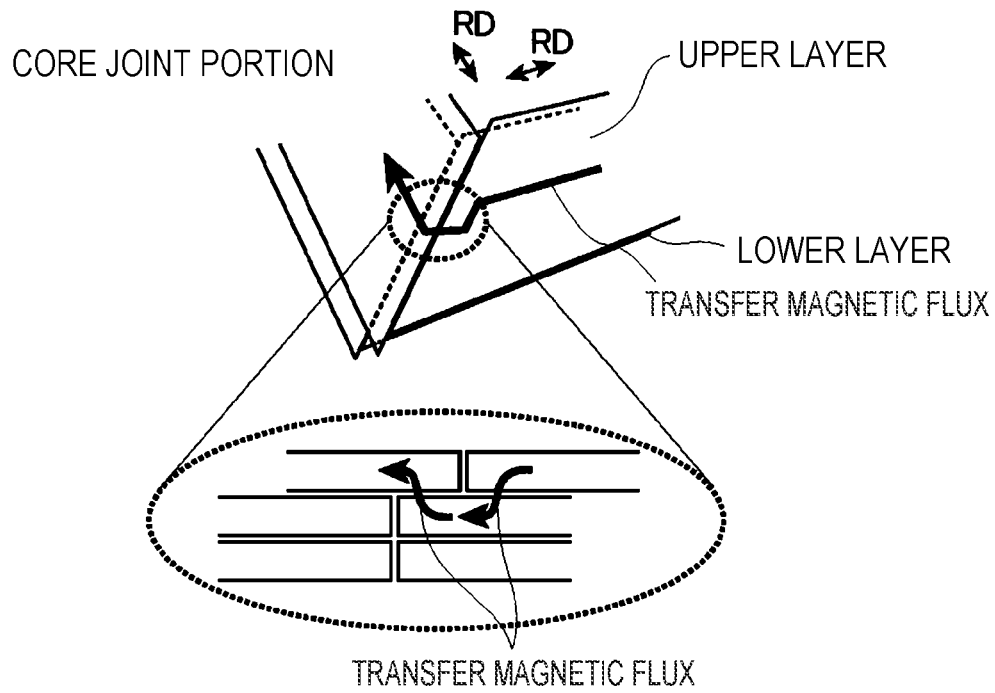
FIG. 3 is a schematic illustration showing a lap joint portion of a stacked core.
Figure 4:
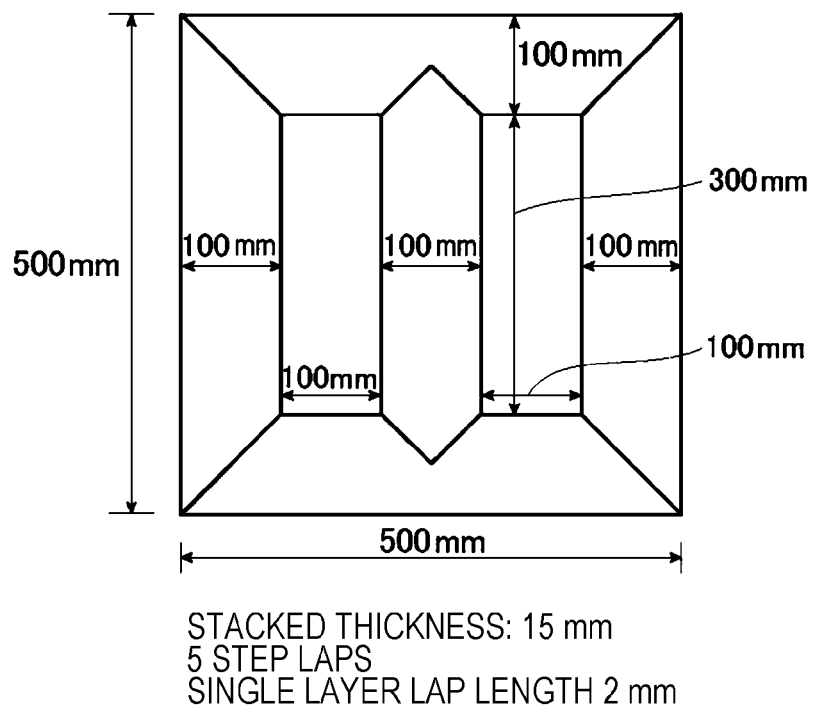
FIG. 4 is a schematic illustration showing the structure of the stacked core used for examination.
Figure 5:
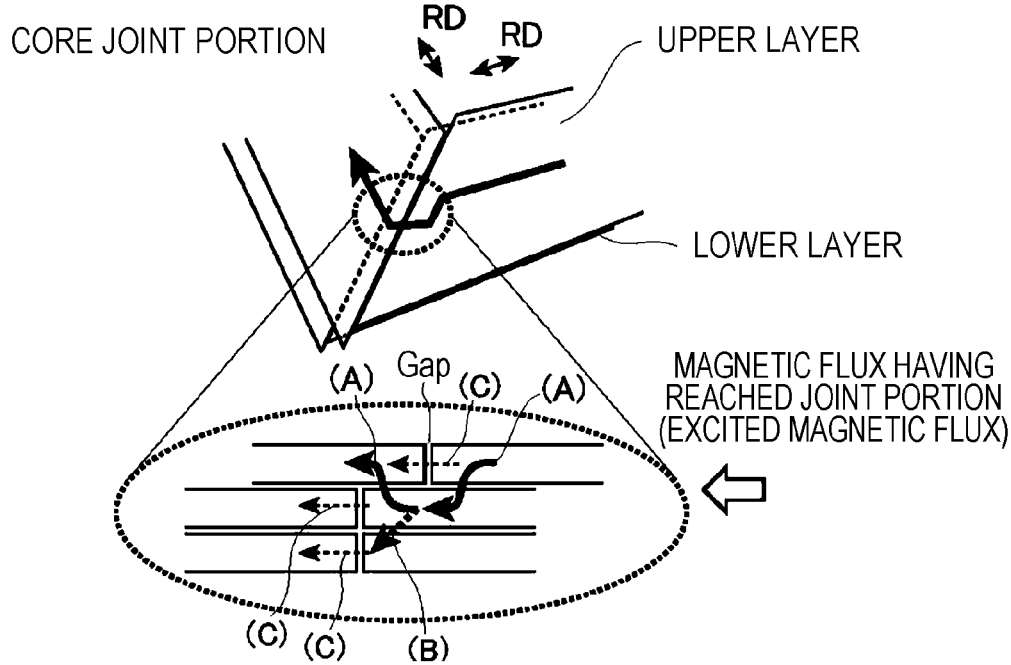
FIG. 5 is a schematic illustration showing magnetic flux flows in a lap joint portion.
Figure 6:
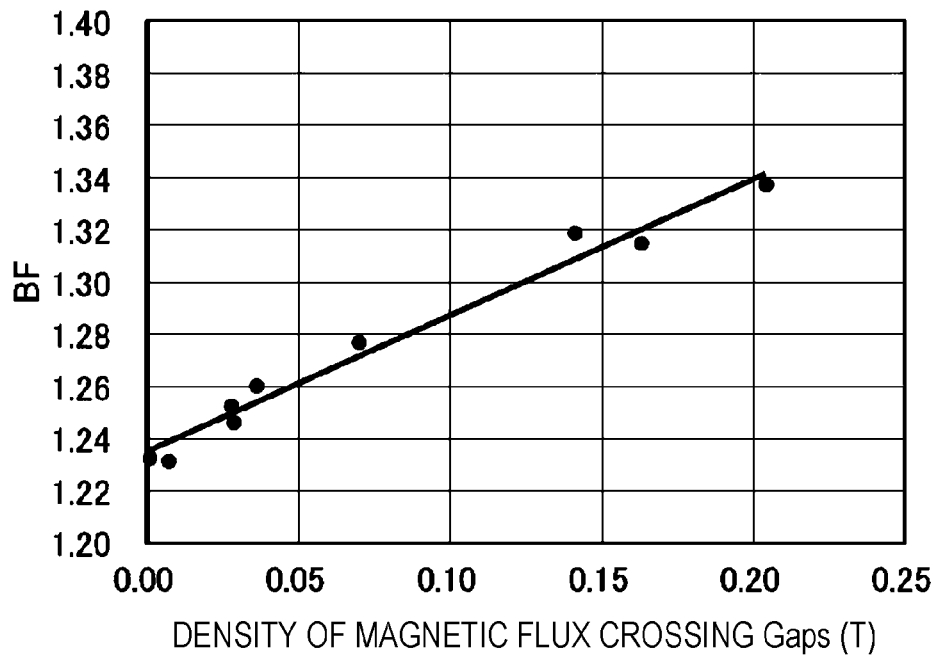
FIG. 6 is a graph showing the relation between magnetic flux density crossing Gaps and BF.
Figure 7:
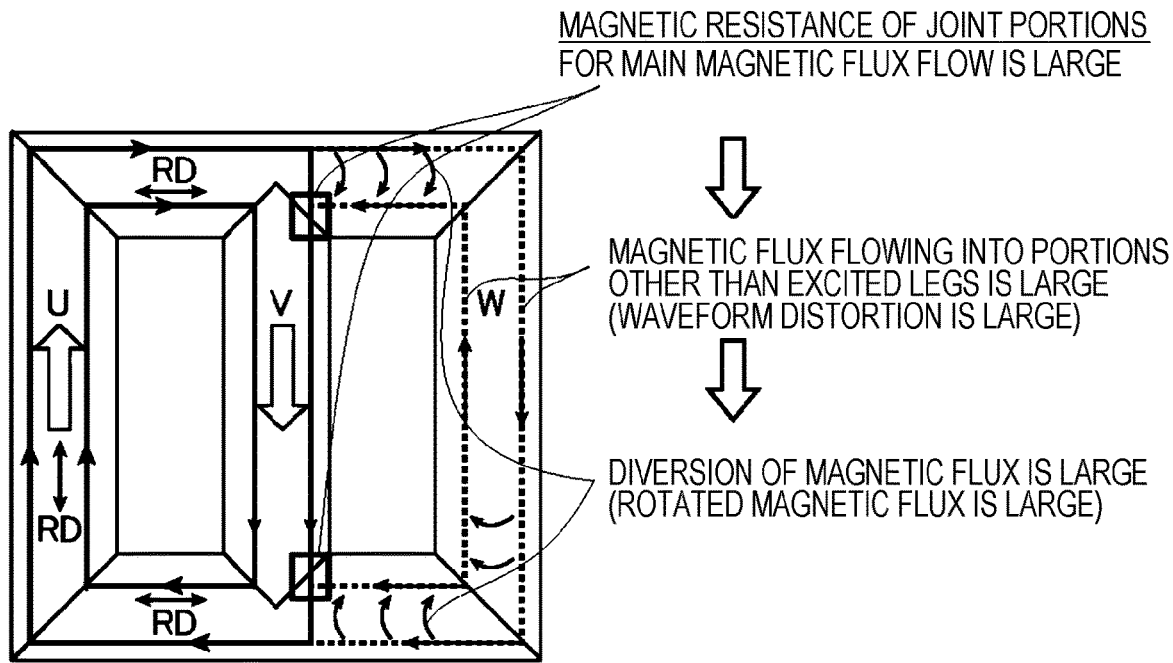
FIG. 7 is a schematic illustration showing magnetic flux flows in a three-phase three-leg core at a certain moment (at the moment when a U-leg and a V-leg are excited and a W-leg is not excited).
Figure 8:
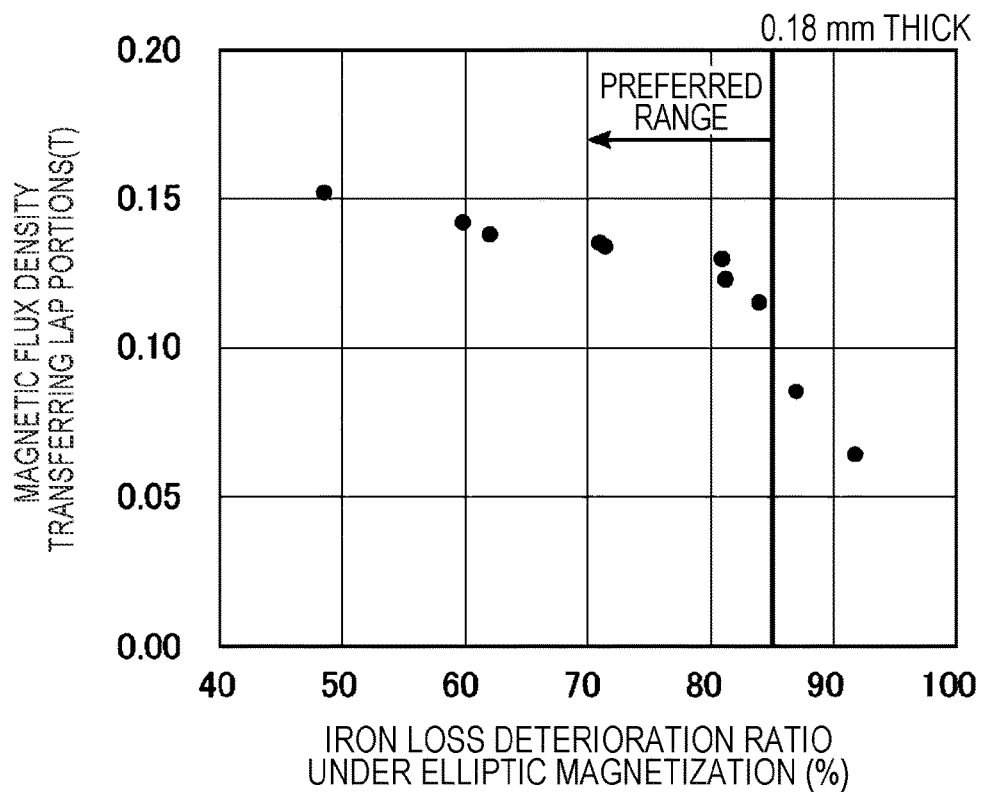
FIG. 8 is a graph showing the relation between an iron loss deterioration ratio and magnetic flux density transferring lap portions when a 0.18 mm-thick material is subjected to elliptic magnetization.
Figure 9:
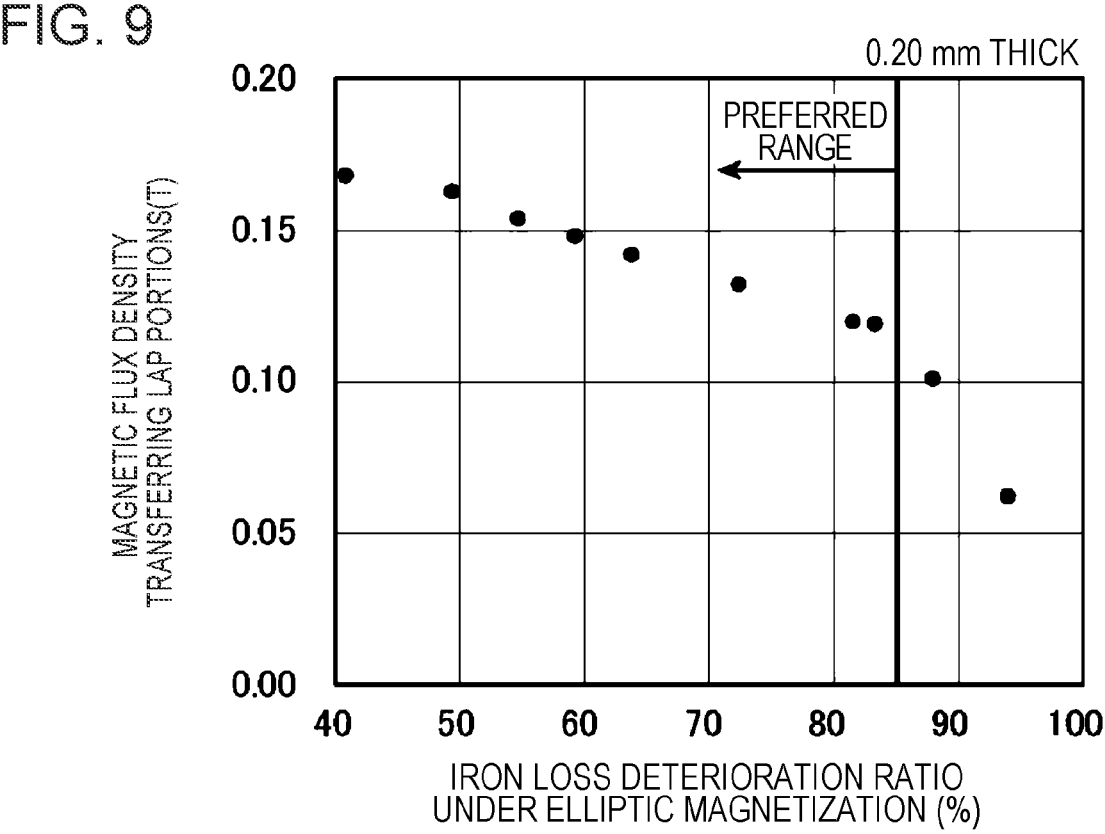
FIG. 9 is a graph showing the relation between the iron loss deterioration ratio and the magnetic flux density transferring lap portions when a 0.20 mm-thick material is subjected to elliptic magnetization.
Figure 10:
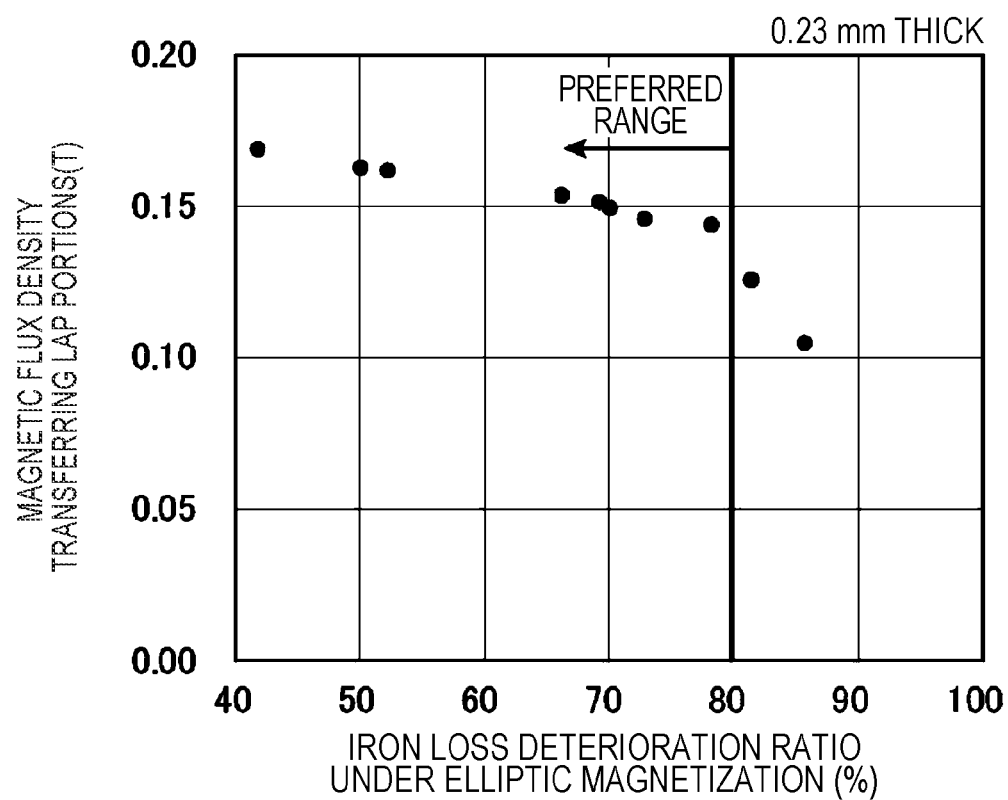
FIG. 10 is a graph showing the relation between the iron loss deterioration ratio and the magnetic flux density transferring lap portions when a 0.23 mm-thick material is subjected to elliptic magnetization.
Figure 11:
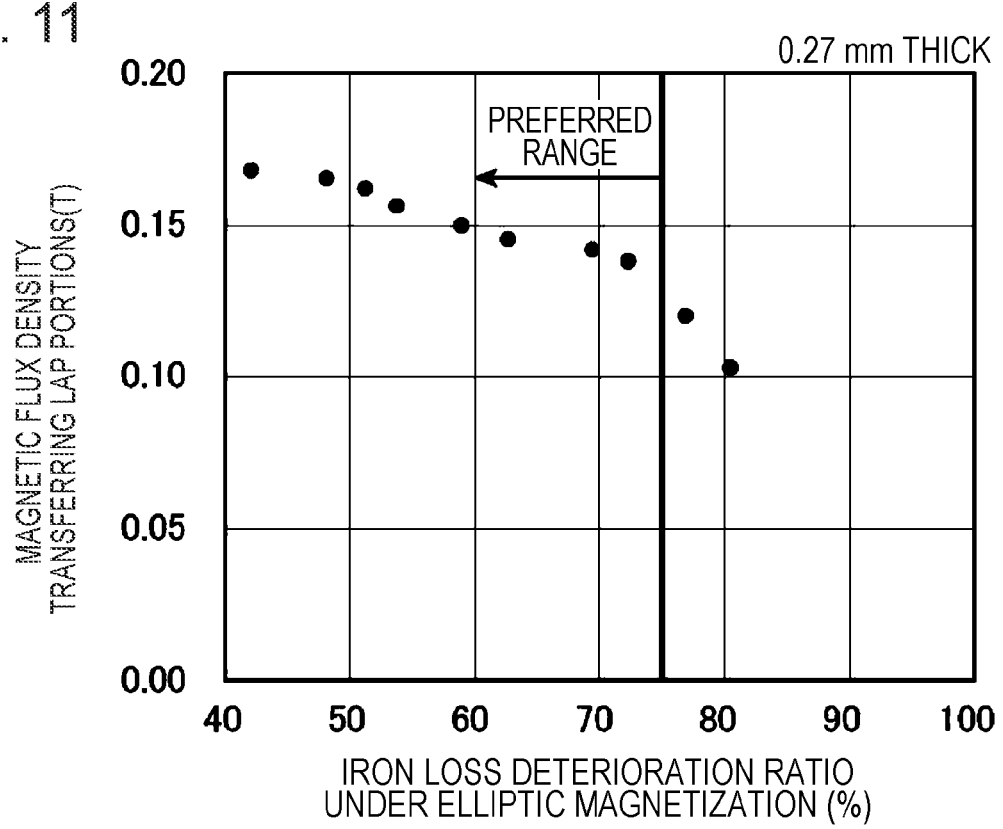
FIG. 11 is a graph showing the relation between the iron loss deterioration ratio and the magnetic flux density transferring lap portions when a 0.27 mm-thick material is subjected to elliptic magnetization.
Figure 12:
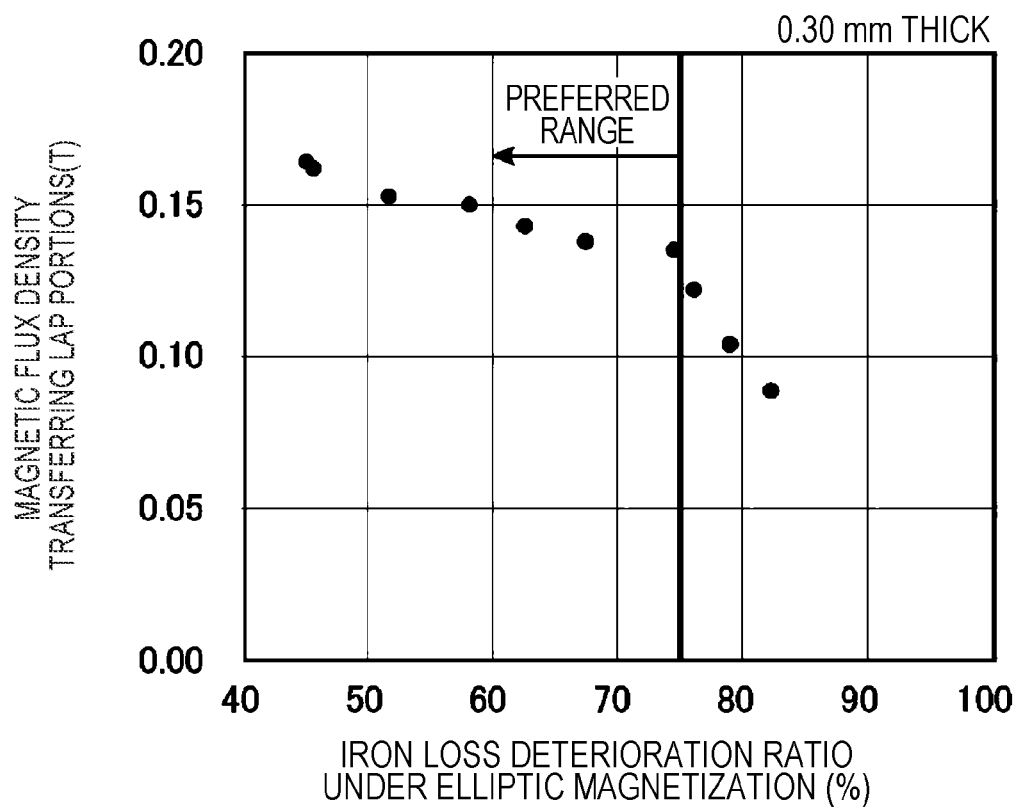
FIG. 12 is a graph showing the relation between the iron loss deterioration ratio and the magnetic flux density transferring lap portions when a 0.30 mm-thick material is subjected to elliptic magnetization.
Figure 13:
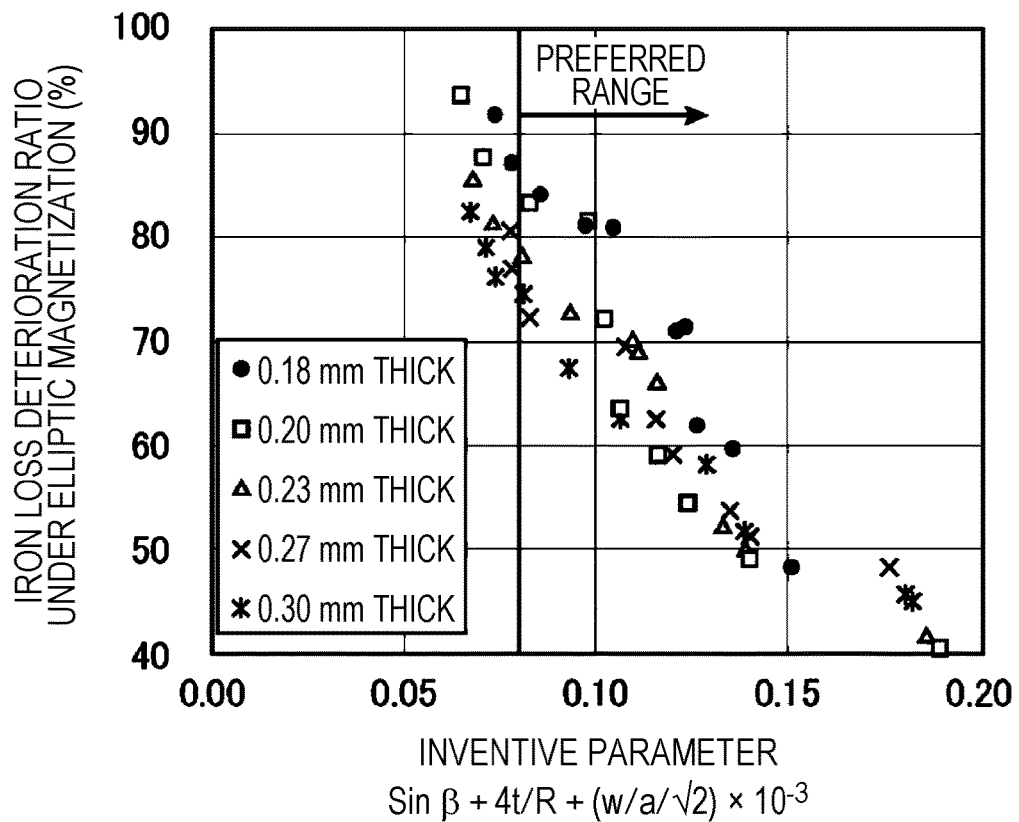
FIG. 13 is a graph showing the relation between an disclosed parameter [Sin β+4t/R+(w/a/√2)×10$^{-3}$] and the iron loss deterioration ratio.

The disclosed embodiments are described in detail. As described above, grain-oriented electrical steel sheets that give excellent transformer iron loss when used for a stacked transformer core must satisfy the following conditions.

The sheet thickness t of each of the grain-oriented electrical steel sheets (a raw material)) and an iron loss deterioration ratio obtained by subjecting steel sheets under elliptic magnetization defined by formula (1) below satisfy the following relations:

when the sheet thickness t≤0.20 mm, the iron loss deterioration ratio is 85% or less;

when 0.20 mm< the sheet thickness t<0.27 mm, the iron loss deterioration ratio is 80% or less; and when 0.27 mm≤sheet thickness t, the iron loss deterioration ratio is 75% or less.

$$\text{(The iron loss deterioration ratio under the elliptic magnetization)} = ((W_A - W_B)/W_B) \times 100, \quad (1)$$

In formula (1), $W_A$ is iron loss under 50 Hz elliptic magnetization of 1.7 T in an RD direction (a rolling direction) and 1.0 T in a TD direction (a direction orthogonal to the rolling direction), and $W_B$ is iron loss under 50 Hz alternating magnetization of 1.7 T in the RD direction.

The iron loss in formula (1) above is measured as follows.
($W_A$: Iron loss under 50 Hz elliptic magnetization of 1.7 T in RD direction and 1.0 T in TD direction)

$W_A$ is measured using a two-dimensional single-sheet tester (2D-SST) described in, for example, Non Patent Literature 3. A grain-oriented electrical steel sheet (raw material) is subjected to 50 Hz sine wave excitation at a maximum magnetic flux density of 1.7 T in the RD direction and a maximum magnetic flux density of 1.0 T in the TD direction, and the difference in phase between the RD direction and the TD direction during the sine wave excitation is set to 90° to perform excitation under elliptic magnetization. In this case, it has been pointed out that the measurement value of the iron loss depends on the rotation direction of the elliptic magnetization and that the measurement value using a clockwise rotation direction differs from the measurement value using a counterclockwise rotation direction. Therefore, both of them are measured and averaged. Various iron loss measurement methods such as a probe method and an H coil method have been proposed, and any of these methods may be used. During excitation, the excitation voltage is feedback-controlled such that the maximum magnetic flux density in the RD direction is 1.7 T and the maximum magnetic flux density in the TD direction is 1.0 T. However, waveform control is not performed except for the moment when the magnetic flux density is maximum even though the waveform of the magnetic flux is slightly distorted from the sine wave. Preferably, the measurement sample has a size of (50 mm×50 mm) or larger in consideration of the number of crystal grains contained in one sample, but this depends on the excitable size of the two-dimensional single-sheet tester. In consideration of variations in the measurement values, it is preferable that at least 30 samples are used for the measurement for one raw material and the average of the measurement values is used.

($W_B$: Iron loss under 50 Hz alternating magnetization of 1.7 T in RD direction)

$W_B$ is measured using the same samples and the same measurement device as those used for the measurement under the elliptic magnetization. 50 Hz sine wave excitation is performed at a maximum magnetic flux density of 1.7 T only in the RD direction. During excitation, the excitation voltage is feedback-controlled such that the maximum magnetic flux density in the RD direction is 1.7 T, and no control is performed in the TD direction.

To cause the iron loss deterioration ratio under the elliptic magnetization to fall within the above range, it is preferable that a plurality of linear strains extending in a direction intersecting the rolling direction are formed on the surface of the grain-oriented electrical steel sheet (raw material) such that the width w of closure domains formed by the strains, the diameter R of secondary recrystallized grains in the steel sheet, and the average β angle of the secondary recrystallized grains in the steel sheet satisfy the relation represented by formula (2) below.

[Math. 4]

$$\sin\beta + 4t/R + (w/a/\sqrt{2}) \times 10^{-3} \geq 0.080, \quad (2)$$

In formula (2),
β: the average β angle (°) of the secondary recrystallized grains,
t: the thickness (mm) of the steel sheet,
R: the diameter (mm) of the secondary recrystallized grains,
w: the width (μm) of the closure domains, and
a: the intervals (mm) between the plurality of linear strains extending in the direction intersecting the rolling direction.

The raw material properties in formula (2) above are measured as follows.

β: Average β angle (°) of secondary recrystallized grains

The β angle is defined as the angle between the <100> axis of secondary recrystallized grains oriented in the rolling direction of the steel sheet and the rolling surface. The secondary recrystallization orientation of the steel sheet is measured by X-ray crystal diffraction. Since the orientations of the secondary recrystallized grains in the steel sheet vary, the measurement is performed at points arranged at a 10 mm RD pitch and a 10 mm TD pitch, and the data measured over a measurement area of (500 mm×500 mm) or larger is averaged to determine the average β angle.

R: Diameter (mm) of secondary recrystallized grains

A coating on the surface of the steel sheet is removed by any chemical or electrical method, and the diameters of the secondary recrystallized grains are measured. The number of crystal grains with a size of about 1 mm2 or larger present in a measurement area with a size of (500 mm×500 mm) or larger is measured by visual inspection or digital image processing, and the average area for one secondary recrystallized grain is determined. The average area is used to compute a circle-equivalent diameter to determine the diameter of the secondary recrystallized grains.

w: Width (μm) of closure domains

The measurement is performed by magnetic domain observation using the Bitter method. The width of the closure domains means portions in which their magnetic domain structure is locally disrupted by the strains introduced and in which the magnetic domain structure parallel to the rolling direction is disconnected or discontinuous. Since the width is not always constant, observation is performed at at least five points along one linear row within a length of 100 mm in a sample, and their average is used as the closure domain width in the linear row. Moreover, at least five linear rows within a longitudinal length of 500 mm in the sample are observed, and their average is used as the width w.

a: Intervals (mm) between the plurality of linear strains extending in direction intersecting rolling direction The intervals are defined as the intervals between linear strained portions in the RD direction. When the intervals between the lines (the intervals between the strains) are not constant, the examination is performed at five points within a longitudinal length of 500 mm, and their average is used. When the line intervals between linear strained regions vary in the width direction of the steel sheet, their average is used.

A method for producing a grain-oriented electrical steel sheet satisfying the above relations will be described. No particular limitation is imposed on the production method. Any method other than the following method can be used so long as formula (2) can be satisfied by controlling the parameters.

Figure 14:
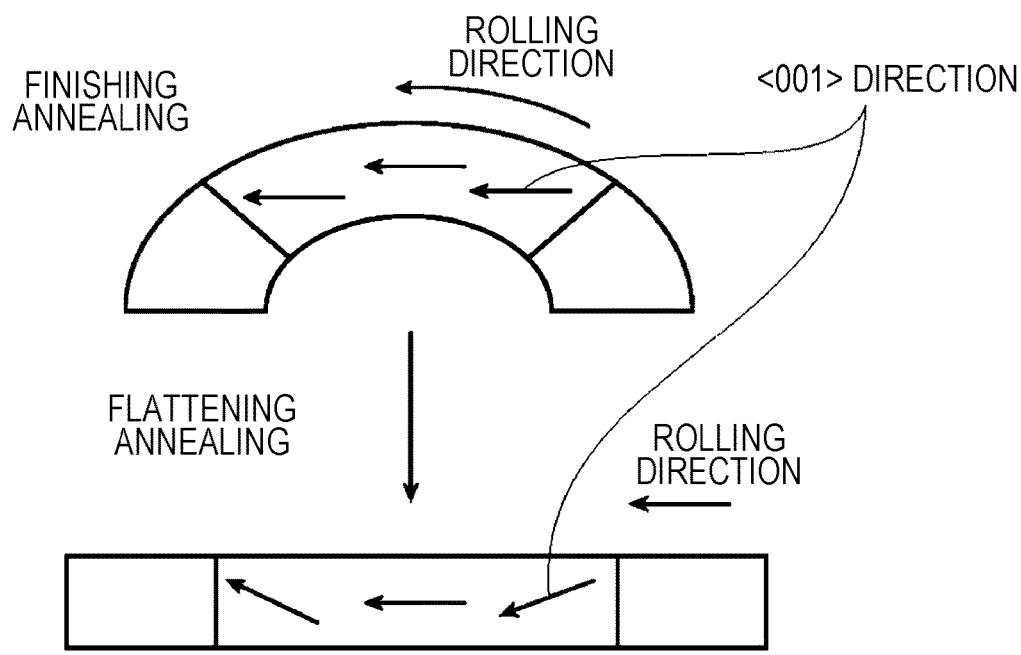
FIG. 14 is a schematic illustration showing an example of a method for controlling an average β angle of secondary recrystallized grains.

The average β angle of the secondary recrystallized grains can be controlled by controlling the primary recrystallization texture or using, for example, a coil set for finishing annealing. For example, when finishing annealing is performed with the coil set formed as shown in FIG. 14, the <001> directions of the crystal grains in the annealed state are uniformly aligned. Then flattening annealing is performed, and the coil is flattened. In this state, the <001> direction of each crystal grain is inclined in the sheet thickness direction according to the coil set used for the finishing annealing, and the β angle increases. Specifically, the smaller the coil set, the larger the β angle after the flattening annealing. If the β angle is excessively large, the magnetic flux density B8 of the raw material decreases, and hysteresis loss deteriorates. Therefore, the β angle is preferably 5° or less.

The diameter (mm) of the secondary recrystallized grains can be controlled by controlling the amount of Goss grains present in the primary recrystallized grains. For example, by increasing the final reduction ratio in cold rolling or increasing friction during rolling to thereby increase the amount of shear strain introduced before primary recrystallization of grains, the amount of the Goss grains in the primary recrystallized grains can be increased. Moreover, the amount of the Goss grains present in the primary recrystallized grains can be controlled also by controlling the heating-up rate during primary recrystallization annealing. The Goss grains in the primary recrystallized grains serve as secondary recrystallization nuclei during finishing annealing. Therefore, the larger the amount of the Goss grains, the larger the amount of secondary recrystallized grains, and therefore the smaller the diameter of the secondary recrystallized grains.

In a method for forming a plurality of linear strains extending in the direction intersecting the rolling direction, it is suitable to use laser irradiation or electron beam irradiation that can introduce large energy with a narrowed beam diameter.

No particular limitation is imposed on the mode of laser oscillation, and any of various modes such as fiber, $CO_2$, and YAG lasers can be used. A continuous irradiation-type laser or pulse oscillation-type laser irradiation such as Q switch-type laser irradiation may be used so long as the range formulas of the present disclosure are satisfied. No particular limitation is imposed on the average laser power P (W), the beam scanning speed V (m/s), and the beam diameter d (mm) during laser irradiation so long as the range formulas of the present disclosure are satisfied. However, since it is necessary to obtain a sufficient magnetic domain refining effect, the energy input amount per unit length P/V is preferably larger than 10 W·s/m.

The conditions for forming the linear strains by electron beam irradiation will be described. No particular limitation is imposed on the acceleration voltage E (kv) the beam current I (mA), and the beam scanning speed V (m/s) during the irradiation so long as the range formulas of the present disclosure are satisfied. However, since it is necessary to obtain a sufficient magnetic domain refining effect, the energy input amount per unit length E×I/V is preferably larger than 6 W·s/m. Preferably, the degree of vacuum in a processing chamber in which the steel sheet is irradiated with the electron beam is 2 Pa or lower. If the degree of vacuum is higher than 2 Pa, the beams is dispersed by residual gas in a path from the electron gun to the steel sheet, and the magnetic domain refining effect becomes small. The steel sheet may be irradiated continuously or in a dotted manner. In a method for introducing strains in a dotted manner, while the beam is scanned rapidly, the scanning of the beam is suspended at prescribed time intervals. The irradiation with the beam is continued at the stopped position for a time suitable for the present disclosure, and then the scanning is resumed. This process is repeated to obtain strains arranged in the dotted manner. To achieve this process in electron beam irradiation, a high-capacity amplifier may be used to change the deflection voltage for the electron beam. If the intervals between the dots during irradiation in the dotted manner are excessively large, the magnetic domain refining effect becomes small. Therefore, the intervals are preferably 0.40 mm or less.

As for the width of the closure domains, it is important to control the beam diameter in the laser irradiation or the electron beam irradiation. When a laser is used, the beam diameter can be increased by changing the optical conditions (such as the focal length) of a lens. When an electron beam is used, the beam diameter can be increased by changing the current conditions for a converging magnetic coil to control the focal length. In the present disclosure, it is preferable that the width of the closure domains is large. However, if the width of the closure domains is excessively large, the amount of stains introduced is excessively large. In this case, the magnetic flux density B8 of the raw material becomes small, and the hysteresis loss deteriorates. Similarly, by lowering the degree of convergence of the beam, the amount of strains introduced is reduced, and the magnetic domain refining effect becomes small, so that the iron loss increases. Therefore, the upper limit of the width of the closure domains is preferably 400 μm or less. The lower limit is not specified. However, from the viewpoint of obtaining the magnetic domain refining effect sufficiently, the lower limit is preferably 20 μm or more.

The intervals between the plurality of liner strains extending in the direction intersecting the rolling direction can be controlled by controlling the beam irradiation intervals. If the intervals between the strains are excessively large, the magnetic domain refining effect obtained by the strains is reduced. Therefore, the intervals are preferably 18 mm or less.

No particular limitation is imposed on the sheet thickness of the grain-oriented electrical steel sheet of the present disclosure. From the viewpoint of manufacturability, stability of secondary recrystallization, etc. the sheet thickness is preferably 0.15 mm or more and more preferably 0.18 mm or more. From the viewpoint of reducing eddy-current loss etc., the sheet thickness is preferably 0.35 mm or less and more preferably 0.30 mm or less.

In the method for producing the grain-oriented electrical steel sheet of the present disclosure used for a stacked core of a transformer, no limitation is imposed on the matters not directly related to the above properties. However, a recommended preferred component composition and some points of the production method of the disclosure other than the points described above will be described.

An inhibitor may be used in the disclosed embodiments. In this case, when, for example, an AlN-based inhibitor is used, appropriate amounts of Al and N may be added. When a MnS.MnSe-based inhibitor is used, appropriate amounts of Mn and Se and/or S may be added. Of course, both the inhibitors may be used in combination. In this case, preferred contents of Al, N, S, and Se are Al: 0.01 to 0.065% by mass, N: 0.005 to 0.012% by mass, S: 0.005 to 0.03% by mass, and Se: 0.005 to 0.03% by mass.

The present disclosure can be applied also to a grain-oriented electrical steel sheet in which the contents of Al, N, S, and Se are limited, i.e., no inhibitor is used. In this case, it is preferable that the amounts of Al, N, S, and Se are limited to Al: 100 mass ppm or less, N: 50 mass ppm or less, S: 50 mass ppm or less, and Se: 50 mass ppm or less.

Other basic components and optional components are as follows.

C: 0.08% by mass or less

If the content of C exceeds 0.08% by mass, it is difficult to reduce the C content to 50 mass ppm or less at which magnetic aging does not occur during the production process. Therefore, the C content is preferably 0.08% by mass or less. The lower limit is not provided because secondary recrystallization can occur even in a raw material containing no C.

Si: 2.0 to 8.0% by mass

Si is an element effective in increasing the electric resistance of steel and reducing iron loss. However, when the content of Si is less than 2.0% by mass, the effect of reducing the iron loss is insufficient. If the content of Si exceeds 8.0% by mass, workability deteriorates significantly, and the magnetic flux density decreases. Therefore, the Si content is preferably within the range of 2.0 to 8.0% by mass.

Mn: 0.005 to 1.0% by mass

Mn is an element necessary for improving hot workability. However, if the Mn content is less than 0.005% by mass, the effect of Mn added is small. If the Mn content exceeds 1.0% by mass, the magnetic flux density of a product sheet decreases. Therefore, the Mn content is preferably within the range of 0.005 to 1.0% by mass.

In addition to the above basic components, the following elements may be appropriately added as components improving the magnetic properties.

At least one selected from Ni: 0.03 to 1.50% by mass, Sn: 0.01 to 1.50% by mass, Sb: 0.005 to 1.50% by mass, Cu: 0.03 to 3.0% by mass, P: 0.03 to 0.50% by mass, Mo: 0.005 to 0.10% by mass, and Cr: 0.03 to 1.50% by mass.

Ni is an element useful to improve the texture of a hot-rolled sheet to thereby improve its magnetic properties. However, if the content is less than 0.03% by mass, the effect of improving the magnetic properties is small. If the content exceeds 1.50% by mass, secondary recrystallization is unstable, so that the magnetic properties deteriorate. Therefore, the amount of Ni is within the range of preferably 0.03 to 1.50% by mass.

Sn, Sb, Cu, P, Mo, and Cr are elements useful to improve the magnetic properties. However, if their contents are lower than their lower limits, the effect of improving the magnetic properties is small. If the contents exceed the upper limits of the components, the growth of the secondary recrystallized grains is impeded. It is therefore preferable that the contents of these components are within the respective ranges described above. The remainder other than the above components is Fe and inevitable impurities mixed during the production process.

The steel having a component composition adjusted to the above preferred component composition may be subjected to a standard ingot making process or a standard continuous casting process to form a slab, or a thin cast piece having a thickness of 100 mm or less may be produced by direct continuous casting process. The slab is heated using a common method and then hot-rolled. However, the slab may be subjected directly to hot-rolling without heating after casting. In the case of the thin cast piece, the steel may be hot-rolled or may be subjected to the subsequent process with the hot-rolling omitted. Then the hot-rolled sheet is optionally annealed and then subjected to cold rolling one time or subjected to cold rolling twice or more with intermediate annealing interposed therebetween to obtain a final sheet thickness. Then the product is subjected to decarbonization annealing and finishing annealing. Then an insulating tension coating is applied, and flattening annealing is performed. Then a plurality of linear strains is formed using a laser or an electron beam. Then an insulating coating may be optionally applied in order to increase insulation and corrosion resistance. In the composition of the steel product, the C content is reduced to 50 ppm or less by the decarbonization annealing, and the contents of Al, N, S, and Se are reduced to the level of inevitable impurities by purification in the finishing annealing.

In the present description, the characteristics of the three-phase three-leg excitation-type stacked core transformer have been described. However, the disclosed embodiments are suitable for stacked core transformers having other joint portion structures such as three-phase five-leg cores and single-phase excitation-type cores.

Figure 15:
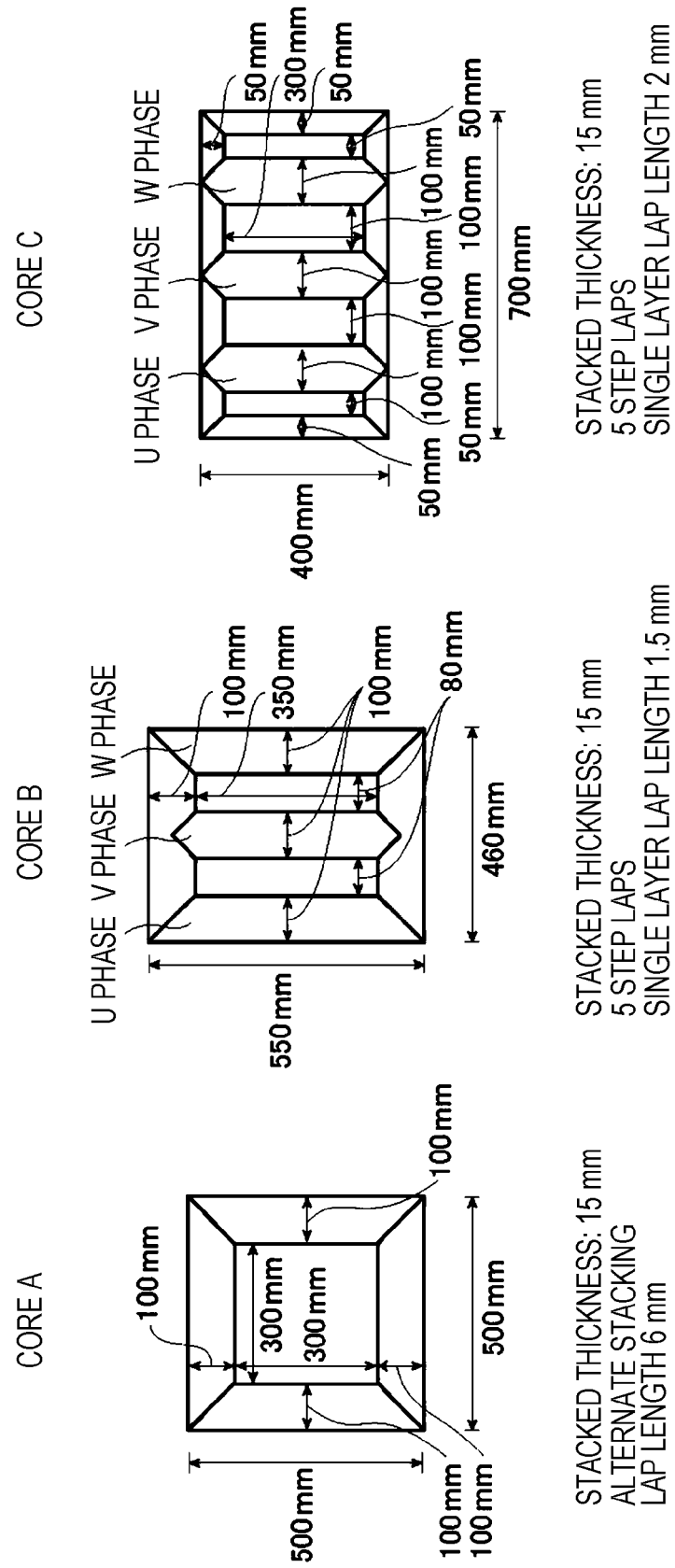
FIG. 15 shows schematic illustrations showing the structures of stacked cores A to C produced in Examples.

EXAMPLES 0.18 to 0.30 mm-thick grain-oriented electrical steel sheets were irradiated with an electron beams under various conditions, and grain-oriented electrical steel sheets having raw material properties shown in Table 3 were obtained. These electrical steel sheets were subjected to two-dimensional magnetic measurement by the method described in the present description to thereby measure their iron loss deterioration ratio under elliptic magnetization. Transformer stacked cores A to C having core shapes shown in FIG. 15 were produced using each of the above materials. As for the core A, a single-phase winding was formed, and iron loss under single-phase excitation at 50 Hz and 1.7 T was measured. As for the cores B and C, a three-phase winding was formed, and iron loss under three-phase excitation at 50 Hz and 1.7 T was measured. The stacked core A shown in FIG. 15 is an alternately stacked core having a stacked thickness of 15 mm and a lap length of 6 mm. The stacked core B is a five-step lap core having a stacked thickness of 15 mm and a single layer lap length of 1.5 mm, and the stacked core C is a five-step lap core having a stacked thickness of 15 mm and a single layer lap length of 2 mm. In grain-oriented electrical steel sheets in which the iron loss deterioration ratio under elliptic magnetization satisfies the range of the present disclosure, the BF for each of the core shapes was smaller than those in Comparative Examples. In particular, when a grain-oriented electrical steel sheet in which the magnetic flux density $B_8$ at a magnetizing force of 800 A/m was equal to or larger than 1.94 T and the diameter R of the secondary recrystallized grains was equal to or larger than 40 mm was used, the material iron loss was small, the Bf was small, and the iron loss of the transformer was very small.

TABLE 3

| Condition | Material properties β: Average angle of secondary recrystallized grains (°) | t: Steel sheet thickness (mm) | R: Secondary recrystallized grain diameter (mm) | Amount of linear strains introduced w: Closure domain width (μm) | a: Intervals between plurality of linear strains extending in direction intersecting rolling direction (mm) | Disclosed parameter*1 | Iron loss deterioration ratio*2 (%) | Material magnetic properties B8(T) | Material iron loss W17/50 (W/kg) | Core A Transformer iron loss (W/kg) | Core A BF | Core B Transformer iron loss (W/kg) | Core B BF | Core C Transformer iron loss (W/kg) | Core C BF | Remarks |
|---|---|---|---|---|---|---|---|---|---|---|---|---|---|---|---|---|
| 1 | 2.7 | 0.18 | 22 | 300 | 4 | 0.133 | 63 | 1.89 | 0.67 | 0.68 | 1.01 | 0.87 | 1.30 | 0.84 | 1.26 | Inventive Example |
| 2 | 2.8 | 0.18 | 25 | 300 | 10 | 0.099 | 72 | 1.89 | 0.69 | 0.70 | 1.01 | 0.92 | 1.34 | 0.88 | 1.27 | Inventive Example |
| 3 | 2.4 | 0.18 | 32 | 120 | 8 | 0.075 | 88 | 1.89 | 0.68 | 0.72 | 1.06 | 1.00 | 1.47 | 0.94 | 1.38 | Comparative Example |
| 4 | 2.6 | 0.18 | 26 | 120 | 12 | 0.080 | 84 | 1.90 | 0.64 | 0.65 | 1.02 | 0.88 | 1.37 | 0.84 | 1.32 | Inventive Example |
| 5 | 2.7 | 0.18 | 23 | 60 | 8 | 0.084 | 80 | 1.88 | 0.69 | 0.70 | 1.02 | 0.94 | 1.36 | 0.90 | 1.31 | Inventive Example |
| 6 | 2.2 | 0.18 | 28 | 300 | 4 | 0.117 | 67 | 1.90 | 0.62 | 0.63 | 1.01 | 0.82 | 1.32 | 0.79 | 1.36 | Inventive Example |
| 7 | 2.1 | 0.18 | 29 | 300 | 10 | 0.083 | 82 | 1.90 | 0.65 | 0.66 | 1.01 | 0.88 | 1.35 | 0.84 | 1.28 | Inventive Example |
| 8 | 2.5 | 0.18 | 32 | 120 | 8 | 0.077 | 86 | 1.91 | 0.62 | 0.66 | 1.06 | 0.92 | 1.48 | 0.86 | 1.29 | Inventive Example |
| 9 | 2.1 | 0.18 | 30 | 120 | 12 | 0.068 | 87 | 1.91 | 0.63 | 0.67 | 1.06 | 0.95 | 1.50 | 0.88 | 1.39 | Comparative Example |
| 10 | 1.8 | 0.18 | 27 | 60 | 7.5 | 0.064 | 92 | 1.92 | 0.61 | 0.66 | 1.08 | 0.93 | 1.52 | 0.86 | 1.40 | Comparative Example |
| 11 | 1.7 | 0.18 | 45 | 250 | 5 | 0.081 | 83 | 1.94 | 0.56 | 0.57 | 1.02 | 0.73 | 1.31 | 0.71 | 1.41 | Inventive Example (particularly preferable) |
| 12 | 1.6 | 0.18 | 52 | 200 | 3 | 0.089 | 80 | 1.95 | 0.54 | 0.55 | 1.01 | 0.70 | 1.30 | 0.68 | 1.27 | Inventive Example (particularly preferable) |
| 13 | 1.3 | 0.18 | 38 | 250 | 4 | 0.086 | 79 | 1.93 | 0.60 | 0.61 | 1.02 | 0.79 | 1.32 | 0.76 | 1.26 | Inventive Example |
| 14 | 1.7 | 0.18 | 59 | 270 | 6 | 0.074 | 87 | 1.95 | 0.58 | 0.61 | 1.06 | 0.86 | 1.48 | 0.81 | 1.26 | Comparative Example |
| 15 | 2.9 | 0.20 | 18 | 300 | 4 | 0.148 | 52 | 1.88 | 0.72 | 0.72 | 1.00 | 0.92 | 1.28 | 0.87 | 1.40 | Inventive Example |
| 16 | 3.1 | 0.20 | 22 | 300 | 10 | 0.112 | 72 | 1.88 | 0.73 | 0.74 | 1.01 | 0.96 | 1.31 | 0.91 | 1.21 | Inventive Example |
| 17 | 3.0 | 0.20 | 19 | 120 | 8 | 0.105 | 74 | 1.89 | 0.71 | 0.72 | 1.01 | 0.93 | 1.31 | 0.87 | 1.24 | Inventive Example |
| 18 | 2.7 | 0.20 | 20 | 120 | 12 | 0.094 | 76 | 1.88 | 0.74 | 0.75 | 1.01 | 0.98 | 1.32 | 0.92 | 1.23 | Inventive Example |
| 19 | 2.8 | 0.20 | 21 | 60 | 8 | 0.092 | 75 | 1.88 | 0.70 | 0.71 | 1.01 | 0.92 | 1.31 | 0.86 | 1.24 | Inventive Example |
| 20 | 2.3 | 0.20 | 32 | 300 | 4 | 0.118 | 72 | 1.92 | 0.64 | 0.65 | 1.01 | 0.84 | 1.31 | 0.79 | 1.23 | Inventive Example |
| 21 | 2.2 | 0.20 | 33 | 300 | 10 | 0.084 | 82 | 1.92 | 0.66 | 0.67 | 1.01 | 0.88 | 1.33 | 0.83 | 1.24 | Inventive Example |
| 22 | 2.4 | 0.20 | 31 | 120 | 8 | 0.078 | 86 | 1.92 | 0.66 | 0.70 | 1.06 | 0.94 | 1.43 | 0.90 | 1.26 | Inventive Example |
| 23 | 2.3 | 0.20 | 34 | 120 | 12 | 0.071 | 88 | 1.92 | 0.67 | 0.71 | 1.06 | 0.97 | 1.45 | 0.93 | 1.37 | Comparative Example |
| 24 | 2.3 | 0.20 | 32 | 60 | 7.5 | 0.071 | 90 | 1.92 | 0.65 | 0.70 | 1.07 | 0.96 | 1.48 | 0.92 | 1.39 | Comparative Example |
| 25 | 1.4 | 0.20 | 43 | 300 | 5 | 0.085 | 82 | 1.95 | 0.60 | 0.61 | 1.01 | 0.77 | 1.29 | 0.76 | 1.41 | Inventive Example (particularly preferable) |

TABLE 3-continued

| Condition | Material properties β: Average angle of secondary recrystallized grains (°) | t: Steel sheet thickness (mm) | R: Secondary recrystallized grain diameter (mm) | Amount of linear strains introduced w: Closure domain width (μm) | a: Intervals between plurality of linear strains extending in direction intersecting rolling direction (mm) | Disclosed parameter*1 | Iron loss deterioration ratio*2 (%) | Material magnetic properties B8(T) | Material iron loss W17/50 (W/kg) | Core A Transformer iron loss (W/kg) | Core A BF | Core B Transformer iron loss (W/kg) | Core B BF | Core C Transformer iron loss (W/kg) | Core C BF | Remarks |
|---|---|---|---|---|---|---|---|---|---|---|---|---|---|---|---|---|
| 26 | 1.8 | 0.20 | 65 | 200 | 3 | 0.091 | 79 | 1.95 | 0.61 | 0.62 | 1.01 | 0.79 | 1.3 | 0.77 | 1.27 | Inventive Example (particularly preferable) |
| 27 | 1.2 | 0.20 | 35 | 260 | 4 | 0.090 | 79 | 1.93 | 0.63 | 0.64 | 1.02 | 0.83 | 1.31 | 0.79 | 1.26 | Inventive Example |
| 28 | 1.3 | 0.20 | 51 | 270 | 6 | 0.070 | 87 | 1.95 | 0.62 | 0.66 | 1.06 | 0.92 | 1.49 | 0.86 | 1.39 | Comparative Example |
| 29 | 2.5 | 0.23 | 14 | 310 | 4 | 0.164 | 42 | 1.91 | 0.75 | 0.75 | 1.00 | 0.95 | 1.26 | 0.89 | 1.19 | Inventive Example |
| 30 | 2.4 | 0.23 | 17 | 290 | 10 | 0.116 | 65 | 1.90 | 0.78 | 0.79 | 1.01 | 1.01 | 1.3 | 0.96 | 1.23 | Inventive Example |
| 31 | 2.6 | 0.23 | 18 | 120 | 8 | 0.107 | 67 | 1.91 | 0.76 | 0.77 | 1.01 | 0.99 | 1.30 | 0.93 | 1.22 | Inventive Example |
| 32 | 2.3 | 0.23 | 16 | 110 | 12 | 0.104 | 72 | 1.91 | 0.77 | 0.78 | 1.01 | 1.01 | 1.31 | 0.95 | 1.23 | Inventive Example |
| 33 | 2.5 | 0.23 | 17 | 60 | 8 | 0.103 | 71 | 1.91 | 0.76 | 0.77 | 1.01 | 1.00 | 1.31 | 0.93 | 1.22 | Inventive Example |
| 34 | 1.8 | 0.23 | 30 | 320 | 4 | 0.119 | 64 | 1.94 | 0.67 | 0.67 | 1.01 | 0.87 | 1.30 | 0.82 | 1.23 | Inventive Example |
| 35 | 1.7 | 0.23 | 32 | 280 | 8 | 0.083 | 78 | 1.94 | 0.68 | 0.69 | 1.01 | 0.90 | 1.32 | 0.84 | 1.24 | Inventive Example |
| 36 | 1.8 | 0.23 | 27 | 120 | 8 | 0.076 | 82 | 1.94 | 0.68 | 0.72 | 1.06 | 0.97 | 1.42 | 0.92 | 1.36 | Comparative Example |
| 37 | 2.0 | 0.23 | 29 | 110 | 12 | 0.073 | 83 | 1.93 | 0.69 | 0.73 | 1.07 | 0.99 | 1.43 | 0.94 | 1.36 | Comparative Example |
| 38 | 1.9 | 0.23 | 28 | 60 | 7.5 | 0.072 | 86 | 1.94 | 0.67 | 0.72 | 1.07 | 0.97 | 1.45 | 0.93 | 1.39 | Comparative Example |
| 39 | 1.9 | 0.23 | 48 | 200 | 5 | 0.081 | 78 | 1.95 | 0.65 | 0.66 | 1.01 | 0.84 | 1.29 | 0.80 | 1.23 | Inventive Example |
| 40 | 1.8 | 0.23 | 72 | 210 | 3 | 0.094 | 72 | 1.96 | 0.64 | 0.65 | 1.02 | 0.83 | 1.30 | 0.78 | 1.22 | Inventive Example (particularly preferable) |
| 41 | 1.7 | 0.23 | 38 | 250 | 4 | 0.098 | 71 | 1.93 | 0.69 | 0.70 | 1.02 | 0.90 | 1.31 | 0.86 | 1.24 | Inventive Example |
| 42 | 1.8 | 0.23 | 66 | 270 | 6 | 0.077 | 88 | 1.95 | 1.67 | 0.72 | 1.07 | 0.99 | 1.48 | 1.94 | 1.4 | Comparative Example |
| 43 | 3.2 | 0.27 | 11 | 300 | 4 | 0.207 | 39 | 1.89 | 0.83 | 0.83 | 1.00 | 1.05 | 1.27 | 1.00 | 1.20 | Inventive Example |
| 44 | 2.9 | 0.27 | 15 | 290 | 10 | 0.143 | 52 | 1.90 | 0.85 | 0.86 | 1.01 | 1.10 | 1.29 | 1.04 | 1.22 | Inventive Example |
| 45 | 2.9 | 0.27 | 12 | 110 | 8 | 0.150 | 49 | 1.89 | 0.84 | 0.85 | 1.01 | 1.08 | 1.28 | 1.02 | 1.21 | Inventive Example |
| 46 | 3.0 | 0.27 | 17 | 120 | 12 | 0.123 | 62 | 1.89 | 0.86 | 0.86 | 1.00 | 1.12 | 1.30 | 1.05 | 1.22 | Inventive Example |
| 47 | 2.9 | 0.27 | 15 | 60 | 8 | 0.128 | 61 | 1.89 | 0.84 | 0.86 | 1.01 | 1.10 | 1.31 | 1.03 | 1.23 | Inventive Example |
| 48 | 2.2 | 0.27 | 28 | 320 | 4 | 0.134 | 58 | 1.93 | 0.78 | 0.79 | 1.00 | 1.01 | 1.29 | 0.94 | 1.21 | Inventive Example |
| 49 | 2.1 | 0.27 | 27 | 300 | 10 | 0.098 | 69 | 1.93 | 0.80 | 0.81 | 1.01 | 1.05 | 1.31 | 0.98 | 1.22 | Inventive Example |
| 50 | 2.3 | 0.27 | 34 | 120 | 8 | 0.083 | 74 | 1.92 | 0.80 | 0.81 | 1.01 | 1.06 | 1.31 | 0.98 | 1.23 | Inventive Example |
| 51 | 2.1 | 0.27 | 31 | 110 | 12 | 0.078 | 77 | 1.93 | 0.82 | 0.87 | 1.06 | 1.16 | 1.42 | 1.11 | 1.35 | Comparative Example |
| 52 | 1.9 | 0.27 | 30 | 60 | 7.5 | 0.075 | 79 | 1.93 | 0.81 | 0.86 | 1.06 | 1.19 | 1.47 | 1.14 | 1.41 | Comparative Example |

TABLE 3-continued

| Condition | Material properties β: Average angle of secondary recrystallized grains (°) | t: Steel sheet thickness (mm) | R: Secondary recrystallized grain diameter (mm) | Amount of linear strains introduced w: Closure domain width (μm) | a: Intervals between plurality of linear strains extending in direction intersecting rolling direction (mm) | Disclosed parameter*1 | Iron loss deterioration ratio*2 (%) | Material magnetic properties B8(T) | Material iron loss W17/50 (W/kg) | Core A Transformer iron loss (W/kg) | Core A BF | Core B Transformer iron loss (W/kg) | Core B BF | Core C Transformer iron loss (W/kg) | Core C BF | Remarks |
|---|---|---|---|---|---|---|---|---|---|---|---|---|---|---|---|---|
| 53 | 1.7 | 0.27 | 46 | 200 | 5 | 0.081 | 72 | 1.95 | 0.77 | 0.78 | 1.01 | 1.00 | 1.30 | 0.94 | 1.22 | Inventive Example (particularly preferable) |
| 54 | 1.3 | 0.27 | 67 | 250 | 4 | 0.083 | 65 | 1.96 | 0.75 | 0.76 | 1.01 | 0.98 | 1.30 | 0.92 | 1.22 | Inventive Example (particularly preferable) |
| 55 | 1.6 | 0.27 | 37 | 250 | 4 | 0.101 | 60 | 1.93 | 0.80 | 0.82 | 1.02 | 1.03 | 1.29 | 0.98 | 1.23 | Inventive Example |
| 56 | 1.8 | 0.27 | 59 | 260 | 7 | 0.076 | 77 | 1.95 | 0.77 | 0.83 | 1.08 | 1.12 | 1.46 | 1.08 | 1.4 | Comparative Example |
| 57 | 2.1 | 0.30 | 35 | 310 | 4 | 0.126 | 56 | 1.93 | 0.89 | 0.89 | 1.00 | 1.15 | 1.29 | 1.08 | 1.21 | Inventive Example |
| 58 | 2.3 | 0.30 | 32 | 300 | 10 | 0.099 | 67 | 1.93 | 0.92 | 0.92 | 1.00 | 1.21 | 1.31 | 1.13 | 1.23 | Inventive Example |
| 59 | 2.4 | 0.30 | 38 | 120 | 8 | 0.084 | 72 | 1.93 | 0.88 | 0.89 | 1.01 | 1.16 | 1.32 | 1.10 | 1.25 | Inventive Example |
| 60 | 2.2 | 0.30 | 36 | 120 | 12 | 0.079 | 76 | 1.93 | 0.90 | 0.96 | 1.07 | 1.29 | 1.43 | 1.22 | 1.36 | Comparative Example |
| 61 | 2.0 | 0.30 | 42 | 60 | 8 | 0.069 | 79 | 1.93 | 0.89 | 0.94 | 1.06 | 1.29 | 1.45 | 1.23 | 1.38 | Comparative Example |
| 62 | 1.7 | 0.30 | 38 | 300 | 4 | 0.114 | 59 | 1.94 | 0.87 | 0.87 | 1.00 | 1.10 | 1.27 | 1.04 | 1.20 | Inventive Example |
| 63 | 1.7 | 0.30 | 35 | 280 | 12 | 0.080 | 74 | 1.94 | 0.90 | 0.91 | 1.01 | 1.18 | 1.31 | 1.11 | 1.23 | Inventive Example |
| 64 | 1.8 | 0.30 | 37 | 120 | 8 | 0.074 | 77 | 1.95 | 0.89 | 0.94 | 1.06 | 1.25 | 1.41 | 1.20 | 1.35 | Comparative Example |
| 65 | 1.8 | 0.30 | 34 | 120 | 12 | 0.074 | 79 | 1.94 | 0.90 | 0.95 | 1.05 | 1.29 | 1.43 | 1.22 | 1.36 | Comparative Example |
| 66 | 1.9 | 0.30 | 39 | 60 | 7.5 | 0.070 | 82 | 1.95 | 0.88 | 0.93 | 1.05 | 1.28 | 1.45 | 1.21 | 1.38 | Comparative Example |
| 67 | 1.5 | 0.30 | 47 | 220 | 5 | 0.083 | 72 | 1.96 | 0.86 | 0.87 | 1.01 | 1.13 | 1.31 | 1.06 | 1.23 | Inventive Example |
| 68 | 1.6 | 0.30 | 64 | 240 | 4 | 0.089 | 65 | 1.97 | 0.87 | 0.88 | 1.01 | 1.12 | 1.29 | 1.05 | 1.21 | Inventive Example (particularly preferable) |
| 69 | 1.7 | 0.30 | 35 | 260 | 5 | 0.101 | 60 | 1.93 | 0.91 | 0.91 | 1.00 | 1.16 | 1.28 | 1.11 | 1.22 | Inventive Example |
| 70 | 1.9 | 0.30 | 59 | 260 | 8 | 0.076 | 77 | 1.96 | 0.85 | 0.92 | 1.08 | 1.25 | 1.47 | 1.20 | 1.41 | Comparative Example |

*1 Sinβ + 4t/R + (W/a/√2) × 10⁻³: underlines indicate that the disclosed prameter is not satisfied.
*2 Iron loss deterioration ratio under elliptic magnetization: underlined values are outside the range of disclosure

The invention claimed is:

1. A grain-oriented electrical steel sheet for a stacked core of a transformer, the steel sheet having a sheet thickness t and an iron loss deterioration ratio defined by formula (1):

$$((W_A - W_B)/W_B) \times 100 \tag{1}$$

where $W_A$ is iron loss of the steel sheet under 50 Hz elliptic magnetization of 1.7 T in a rolling direction and 1.0 T in a direction orthogonal to the rolling direction, and $W_B$ is iron loss of the steel sheet under 50 Hz alternating magnetization of 1.7 T in the rolling direction, wherein, when t≤0.20 mm, the iron loss deterioration ratio is 85% or less, when 0.20 mm<t<0.27 mm, the iron loss deterioration ratio is 80% or less, and when t≥0.27 mm, the iron loss deterioration ratio is 75% or less.

2. The grain-oriented electrical steel sheet according to claim 1, wherein a plurality of linear strains extending in a direction intersecting the rolling direction are formed on a surface of the steel sheet, and a width w of closure domains formed by the strains, a diameter R of secondary recrystallized grains in the steel sheet, and an average β angle of the secondary recrystallized grains in the steel sheet satisfy formula (2):

$$\sin \beta + 4t/R + (w/a\sqrt{2}) \times 10^{-3} \geq 0.080, \tag{2}$$

where β is the average β angle (°) of the secondary recrystallized grains, t is the thickness (mm) of the steel sheet, R is the diameter (mm) of the secondary recrystallized grains, w is the width (μm) of the closure domains, and a is intervals (mm) between the plurality of linear strains extending in the direction intersecting the rolling direction.

3. The grain-oriented electrical steel sheet according to claim 2, wherein the steel sheet has a magnetic flux density B8 that is 1.94 T or more at a magnetizing force of 800 A/m, and the diameter R of the secondary recrystallized grains is 40 mm or more.

4. The grain-oriented electrical steel sheet according to claim 1, wherein the steel sheet has a magnetic flux density B8 that is 1.94 T or more at a magnetizing force of 800 A/m, and the diameter R of the secondary recrystallized grains is 40 mm or more.

5. A stacked core of a transformer, the stacked core being formed from the grain-oriented electrical steel sheet according to claim 1.

6. A method for producing a stacked core of a stacked core transformer, the method allowing a building factor to be reduced, the building factor being obtained by dividing a value of iron loss of the stacked core transformer by a value of iron loss of grain-oriented electrical steel sheets used as a raw material of the stacked core, the method comprising:

stacking the grain-oriented electrical steel sheets to form the stacked core, wherein a sheet thickness t of each of the grain-oriented electrical steel sheets and an iron loss deterioration ratio obtained when the grain-oriented electrical steel sheets are subjected to elliptic magnetization satisfy the following relationships:

when t≤0.20 mm, the iron loss deterioration ratio is 85% or less;

when 0.20 mm<t<0.27 mm, the iron loss deterioration ratio is 80% or less; and when 0.27 mm≤t, the iron loss deterioration ratio is 75% or less, and the iron loss deterioration ratio is defined by formula (1) below:

$$((W_A - W_B)/W_B) \times 100 \tag{1}$$

where, in formula (1):

$W_A$ is iron loss under 50 Hz elliptic magnetization of 1.7 T in a rolling direction and 1.0 T in a direction orthogonal to the rolling direction, and $W_B$ is iron loss under 50 Hz alternating magnetization of 1.7 T in the rolling direction.

7. The method for producing a stacked core according to claim 6, wherein each of the steel sheets includes:

secondary recrystallized grains in each of the steel sheets, and a plurality of linear strains that is formed on a surface of each of the steel sheets, the plurality of linear strains extending in a direction intersecting the rolling direction, and a width w of closure domains formed by the strains, a diameter R of the secondary recrystallized grains, and an average β angle of the secondary recrystallized grains satisfy the relation represented by the following formula (2):

$$\sin \beta + 4t/R + (w/a\sqrt{2}) \times 10^{-3} \geq 0.080, \tag{2}$$

where, in formula (2):

β: the average β angle (°) of the secondary recrystallized grains, t: the thickness (mm) of each of the steel sheets, R: the diameter (mm) of the secondary recrystallized grains, w: the width (m) of the closure domains, and a: intervals (mm) between the plurality of linear strains extending in the direction intersecting the rolling direction.

8. The method for producing a stacked core according to claim 7, wherein each of the steel sheets has a magnetic flux density B8 that is 1.94 T or more at a magnetizing force of 800 A/m, and the diameter R of the secondary recrystallized grains is 40 mm or more.

9. The method for producing a stacked core according to claim 6, wherein each of the steel sheets has a magnetic flux density B8 that is 1.94 T or more at a magnetizing force of 800 A/m, and the diameter R of the secondary recrystallized grains is 40 mm or more.

10. A stacked core of a transformer, the stacked core being formed from the grain-oriented electrical steel sheet according to claim 2.

11. A stacked core of a transformer, the stacked core being formed from the grain-oriented electrical steel sheet according to claim 4.

12. A stacked core of a transformer, the stacked core being formed from the grain-oriented electrical steel sheet according to claim 3.

* * * * *